US007032861B2

(12) United States Patent
Sanders, Jr. et al.

(10) Patent No.: US 7,032,861 B2
(45) Date of Patent: Apr. 25, 2006

(54) QUIET VERTICAL TAKEOFF AND LANDING AIRCRAFT USING DUCTED, MAGNETIC INDUCTION AIR-IMPELLER ROTORS

(76) Inventors: John K. Sanders, Jr., 2775 Mesa Verde East, Apt. C-212, Costa Mesa, CA (US) 92626; J. Kenneth Sanders, 269 Kaelepulu Dr., Oahu, HI (US) 96734; Arturo Aviles, Jr., 9841 Mammoth Dr., Huntington Beach, CA (US) 92646; Arturo F. Aviles, 9581 Zetland Dr., Huntington Beach, CA (US) 92646

( * ) Notice: Subject to any disclaimer, the term of this patent is extended or adjusted under 35 U.S.C. 154(b) by 119 days.

(21) Appl. No.: 10/763,973

(22) Filed: Jan. 22, 2004

(65) Prior Publication Data

US 2006/0049304 A1 Mar. 9, 2006

Related U.S. Application Data

(63) Continuation-in-part of application No. 29/175,100, filed on Jan. 23, 2003, and a continuation-in-part of application No. 10/666,936, filed on Jan. 7, 2002, now abandoned.

(51) Int. Cl.
*B64C 15/00* (2006.01)

(52) U.S. Cl. .................... 244/23 A; 244/12.1; 416/170

(58) Field of Classification Search ...... 244/12.1–12.3, 244/17.19, 60, 23 R, 23 A, 23 B, 17.11; 310/46, 61–63; 417/350, 420, 423.1, 423.7; 416/170

See application file for complete search history.

(56) References Cited

U.S. PATENT DOCUMENTS 3,997,131 A * 12/1976 Kling ........................ 244/23 R (Continued)

OTHER PUBLICATIONS http://www.aeromobile.com/aeromobile_vers2/Gimbal_Fan/gimbal_fan.htm.*
http://www.aeromobile.com/aeromobile_vers2/Videos/video_gimbalfan/video_gimabalfan.htm.*

(Continued)

*Primary Examiner*—Peter M. Poon
*Assistant Examiner*—Timothy D. Collins
(74) *Attorney, Agent, or Firm*—Leighton K. Chong; Godbey Griffiths Reiss & Chong

(57) ABSTRACT

A hover aircraft employs an air impeller engine having an air channel duct and a rotor with outer ends of its blades fixed to an annular impeller disk that is driven by magnetic induction elements arrayed in the air channel duct. The air-impeller engine is arranged vertically in the aircraft frame to provide vertical thrust for vertical takeoff and landing. Preferably, the air-impeller engine employs dual, coaxial, contra-rotating rotors for increased thrust and gyroscopic stability. An air vane assembly directs a portion of the air thrust output at a desired angle to provide a horizontal thrust component for flight maneuvering or translation movement. The aircraft can employ a single engine in an annular fuselage, two engines on a longitudinal fuselage chassis, three engines in a triangular arrangement for forward flight stability, or other multiple engine arrangements in a symmetric, balanced configuration. Other flight control mechanisms may be employed, including side winglets, an overhead wing, and/or air rudders or flaps. An integrated flight control system can be used to operate the various flight control mechanisms. Electric power is supplied to the magnetic induction drives by high-capacity lightweight batteries or fuel cells. The hover aircraft is especially well suited for applications requiring VTOL deployment, hover operation for quiet surveillance, maneuvering in close air spaces, and long duration flights for continuous surveillance of ground targets and important facilities requiring constant monitoring.

14 Claims, 29 Drawing Sheets

U.S. PATENT DOCUMENTS

| | | | | |
|---|---|---|---|---|
| 5,303,879 A | * | 4/1994 | Bucher | 244/23 C |
| 5,351,911 A | * | 10/1994 | Neumayr | 244/23 C |
| 5,454,531 A | * | 10/1995 | Melkuti | 244/12.6 |
| 5,653,404 A | * | 8/1997 | Ploshkin | 244/12.2 |
| 6,113,029 A | * | 9/2000 | Salinas | 244/23 C |
| 6,464,166 B1 | * | 10/2002 | Yoeli | 244/12.1 |

OTHER PUBLICATIONS

Office of Secreatry of Defense, "Unmanned Aerial Vehicles Roadmap, 2000-2025" dated Apr. 2001.

* cited by examiner

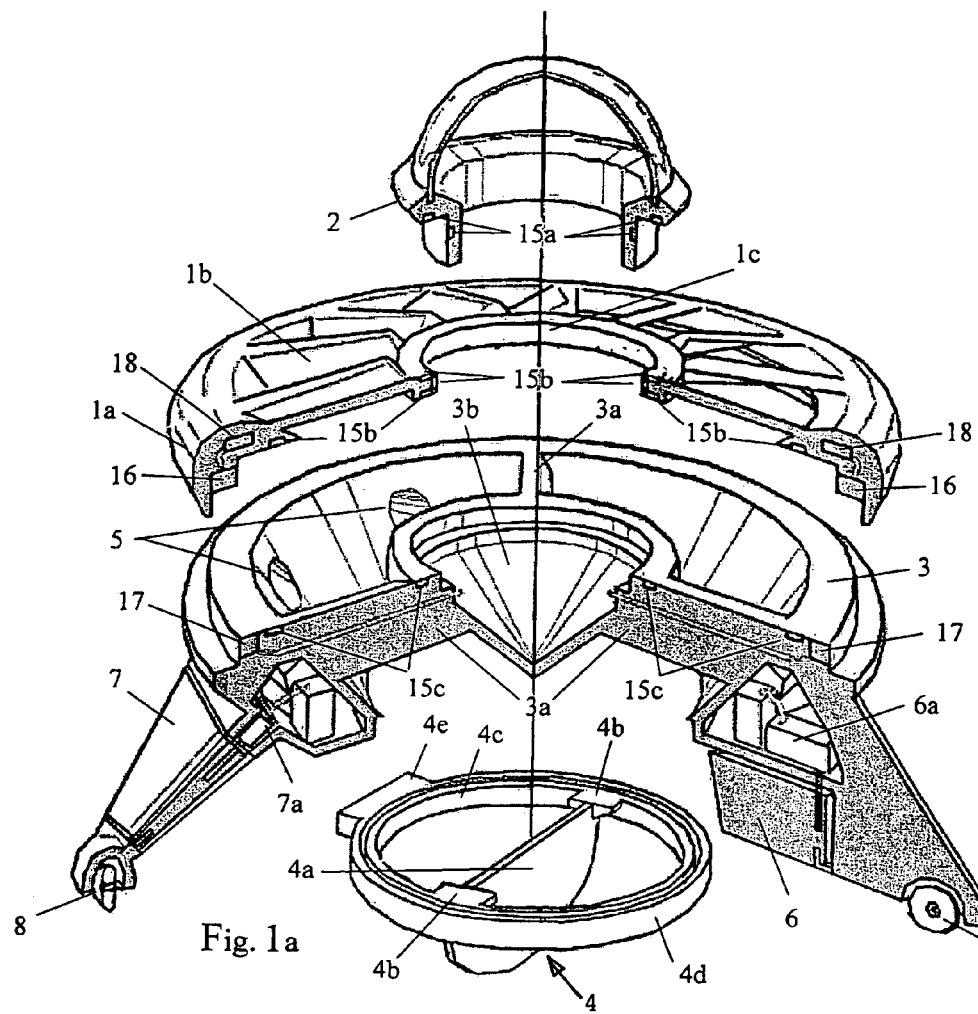
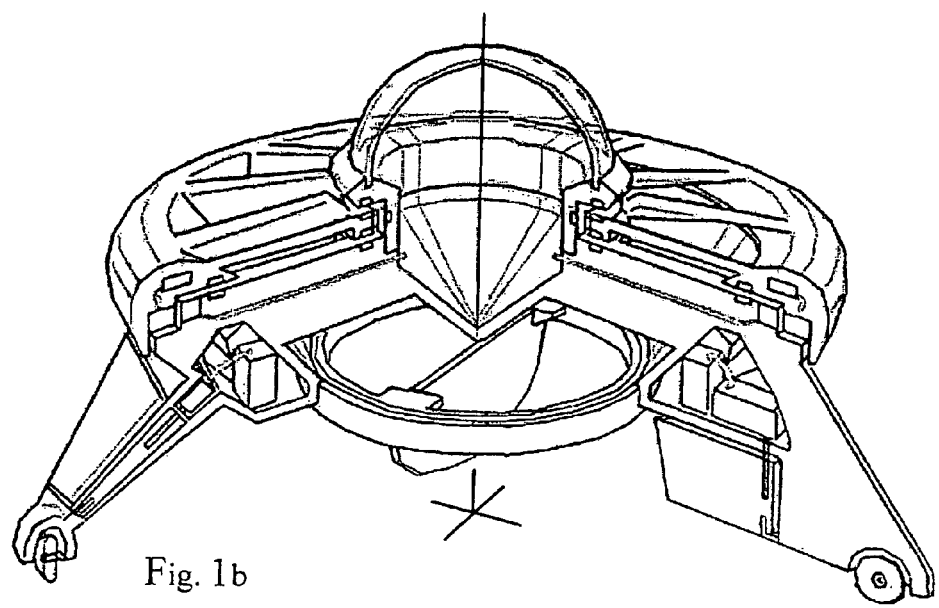
Fig. 1a
Fig. 1b

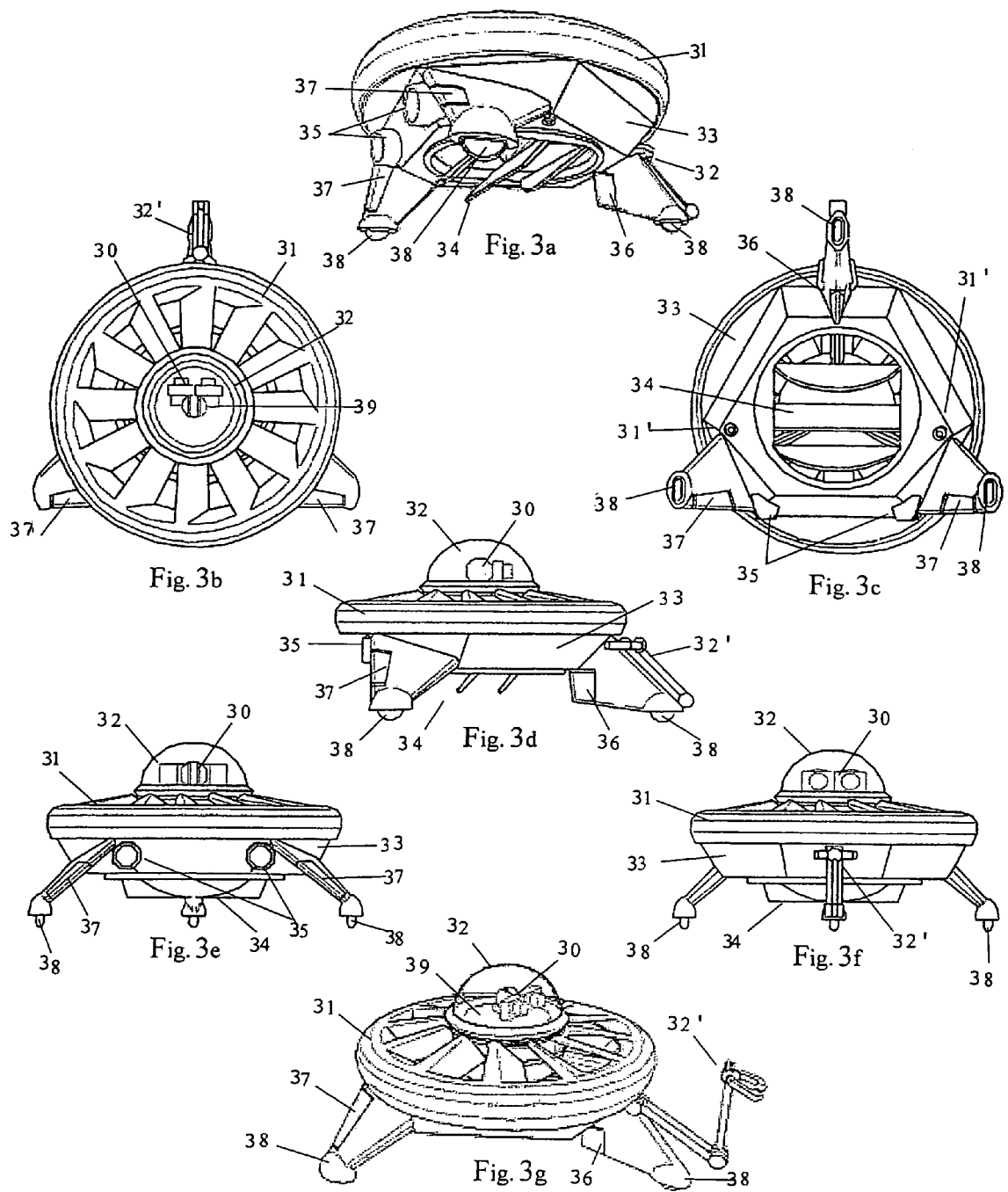

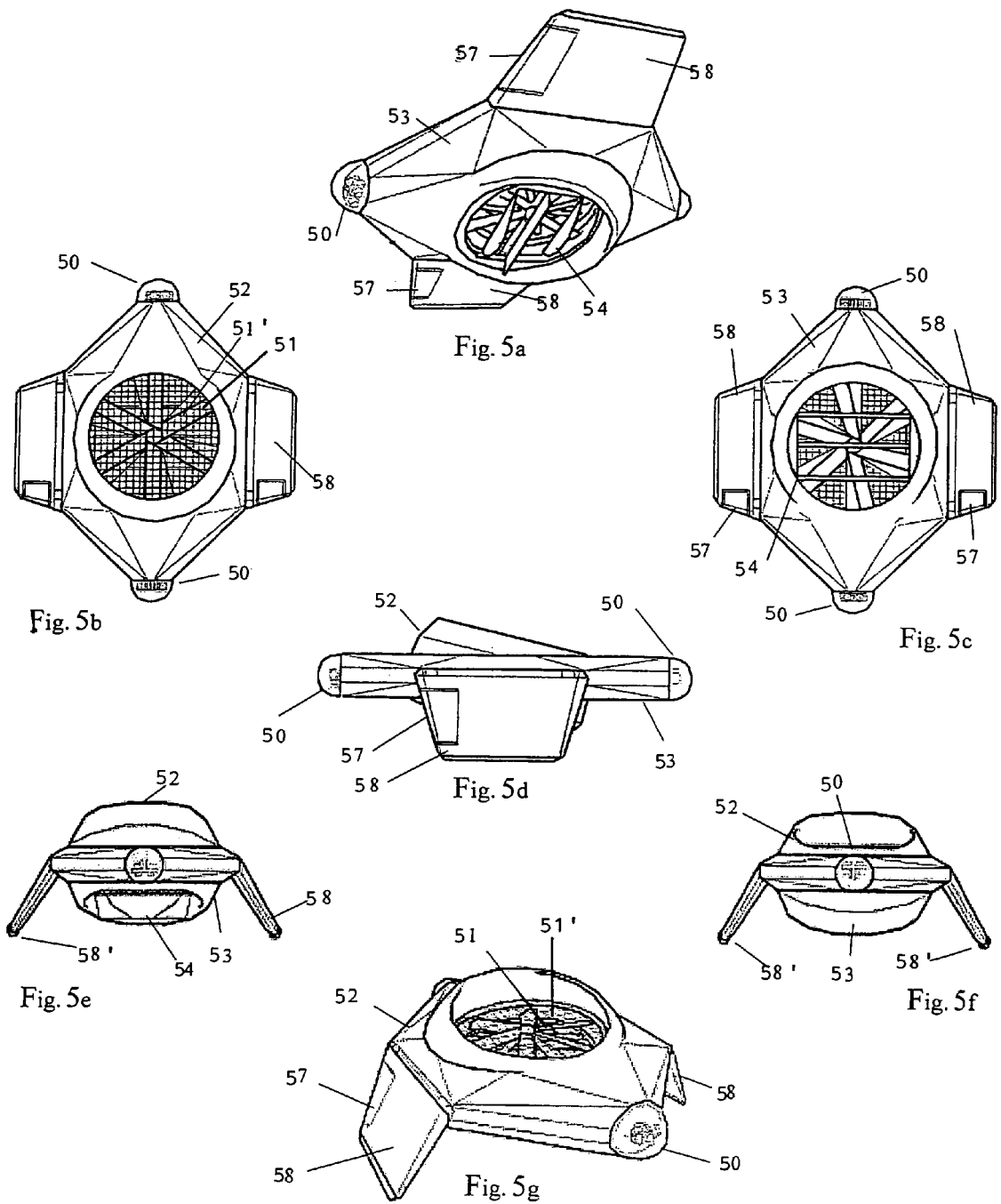

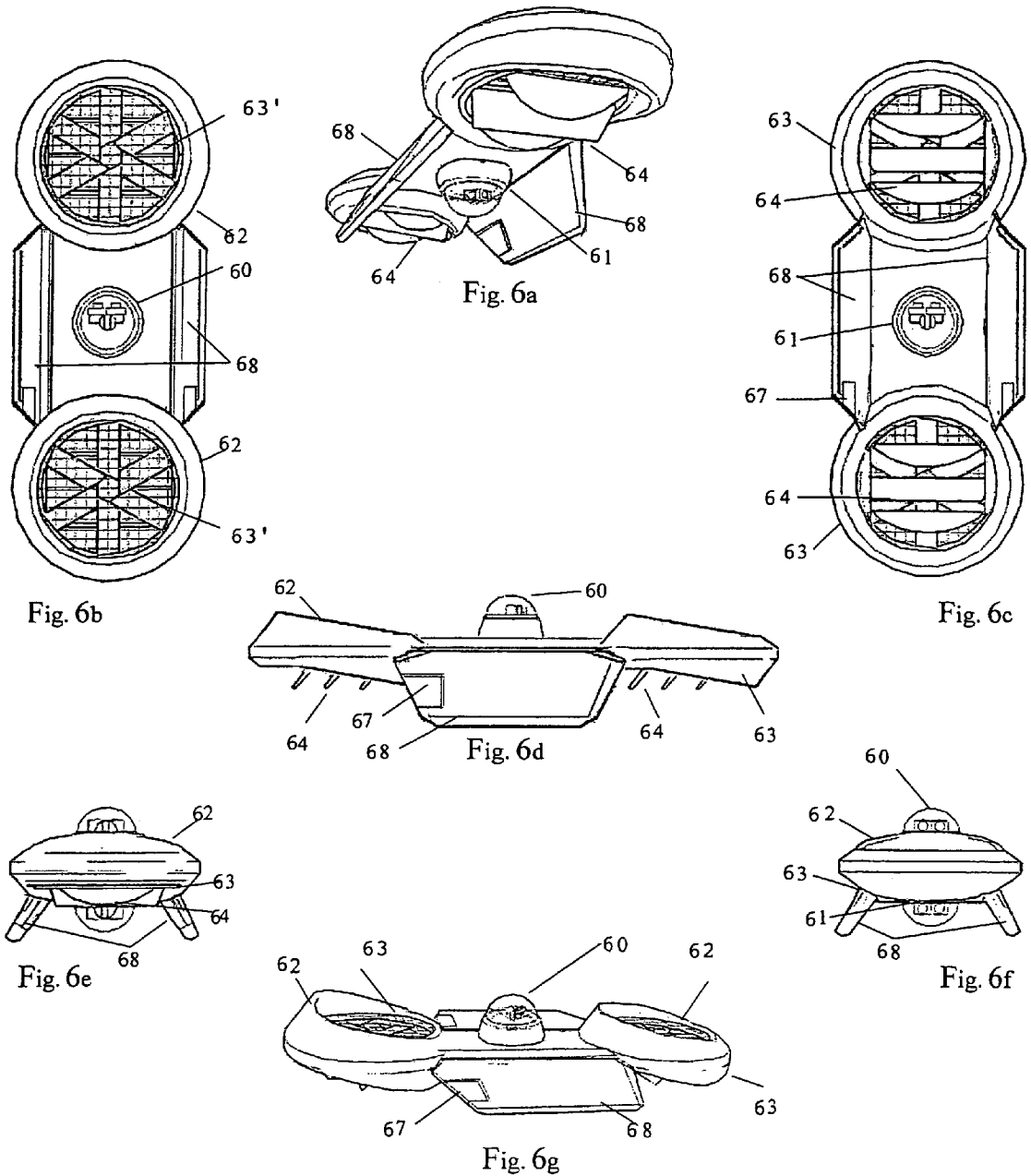

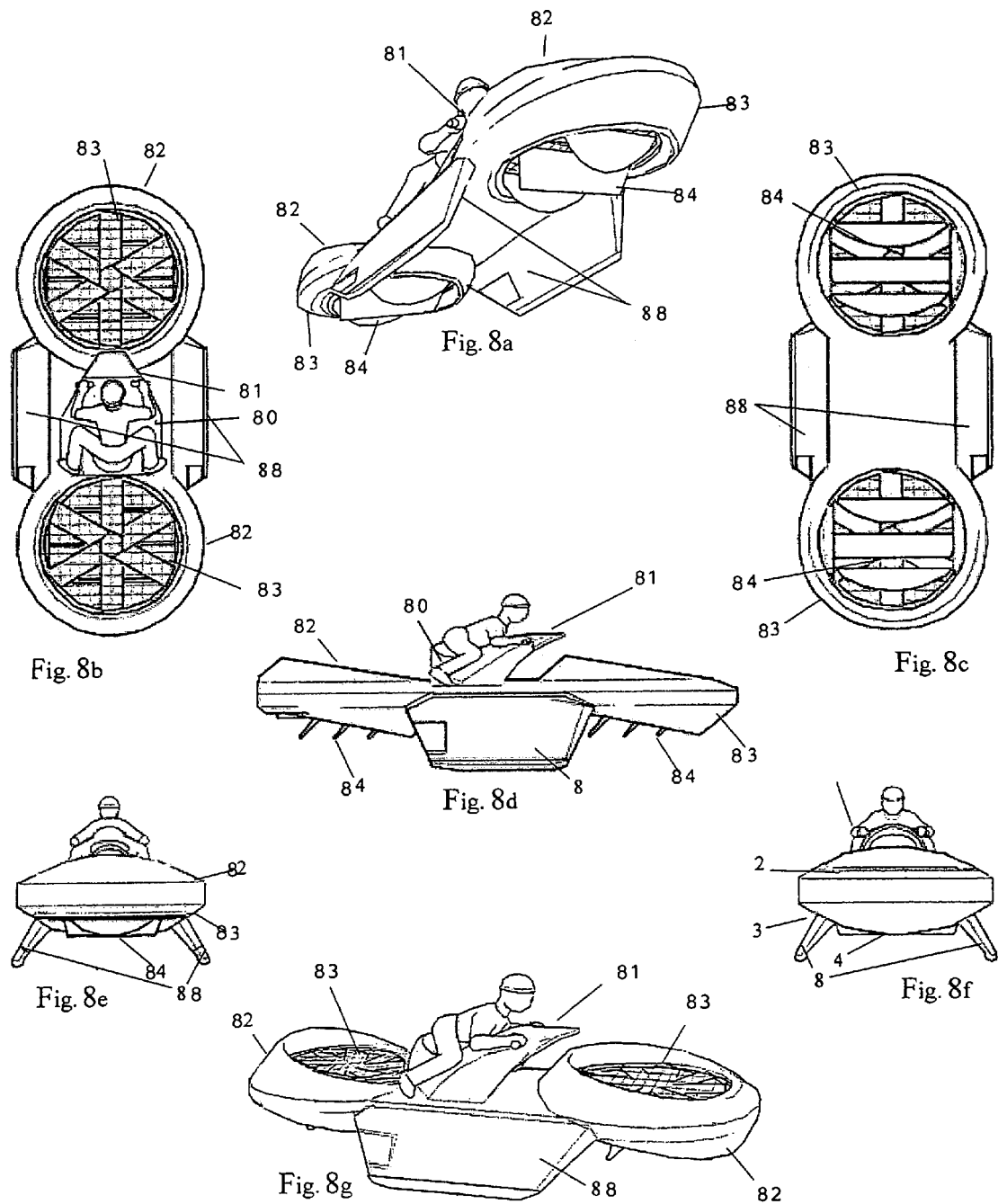

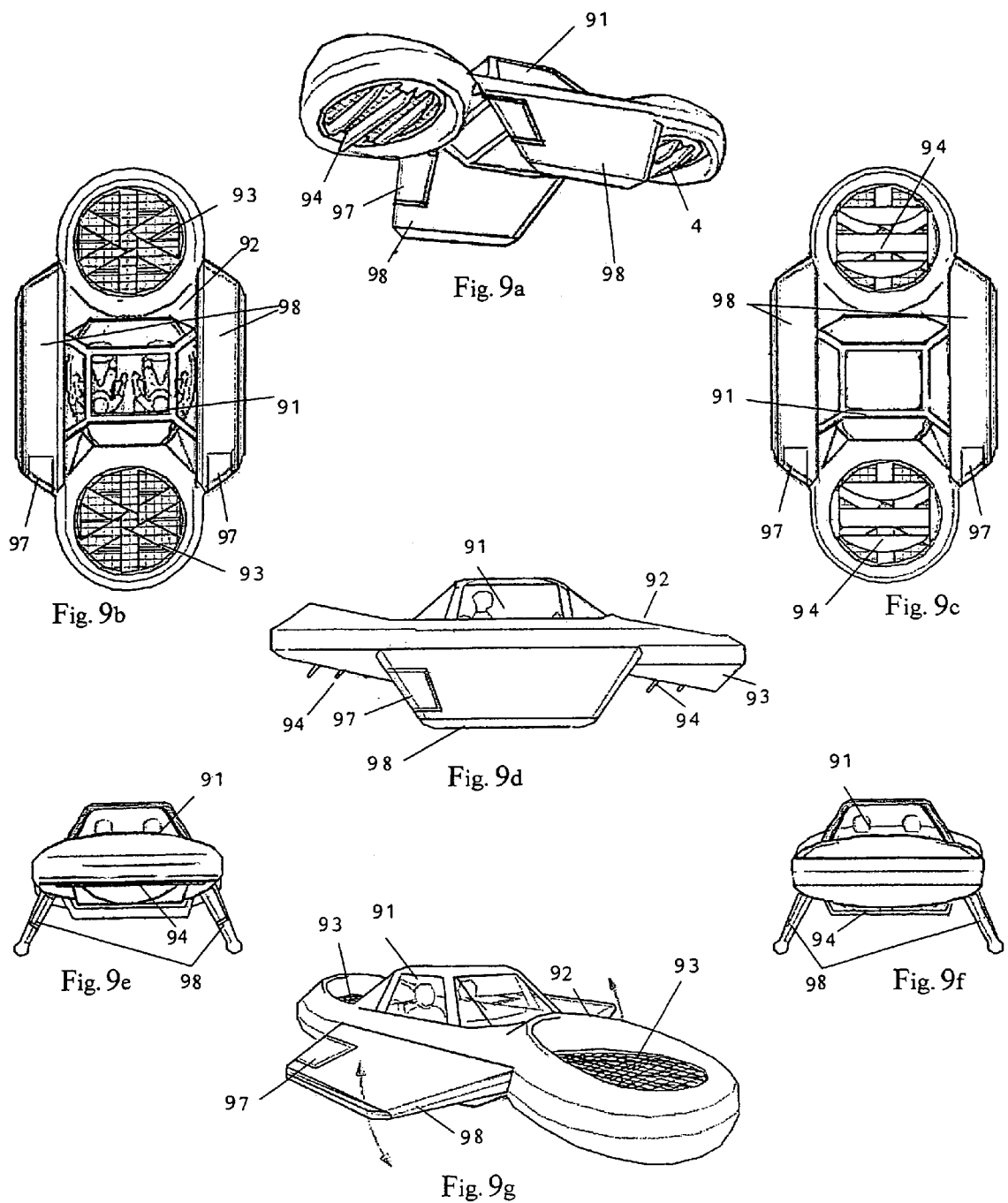

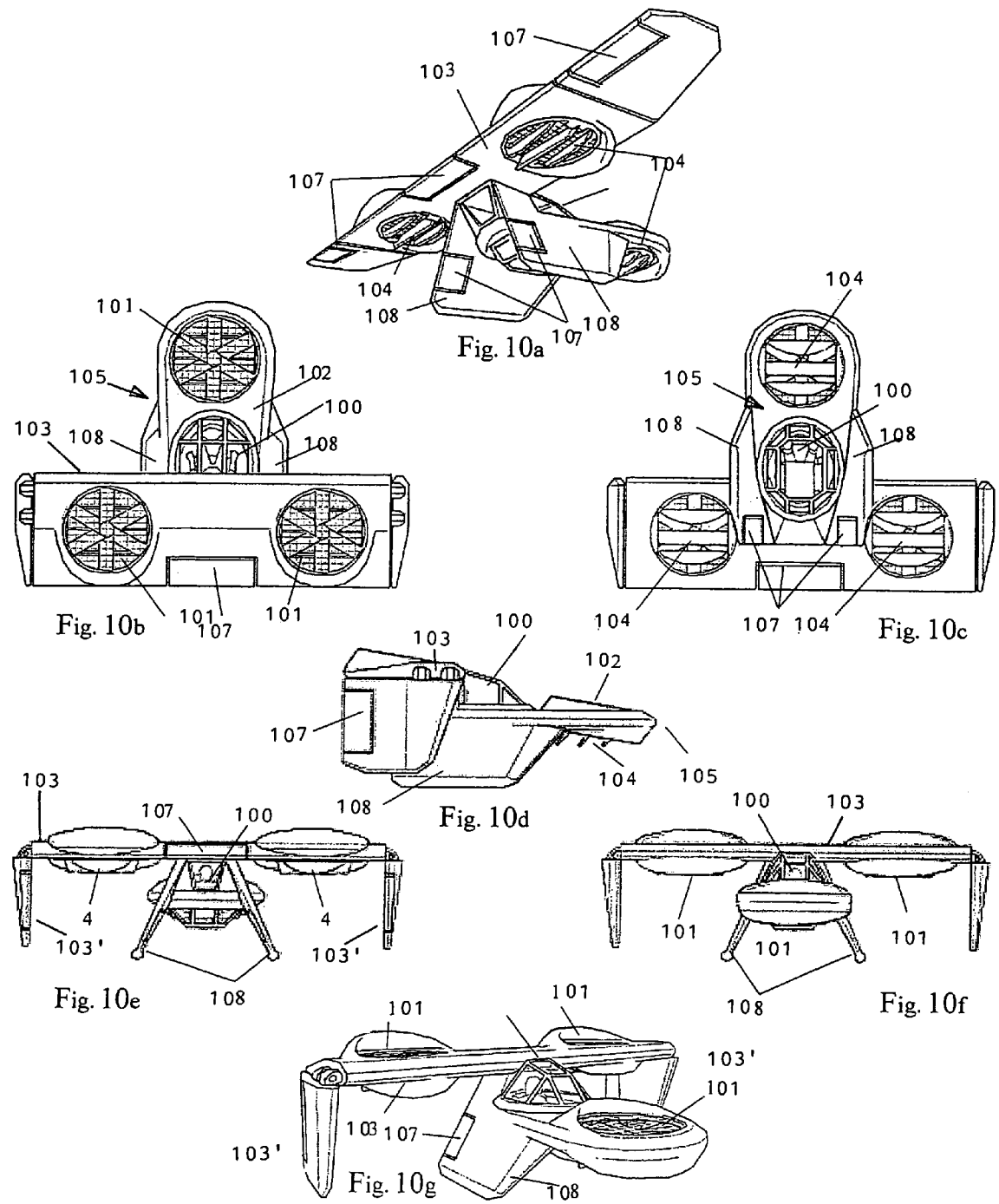

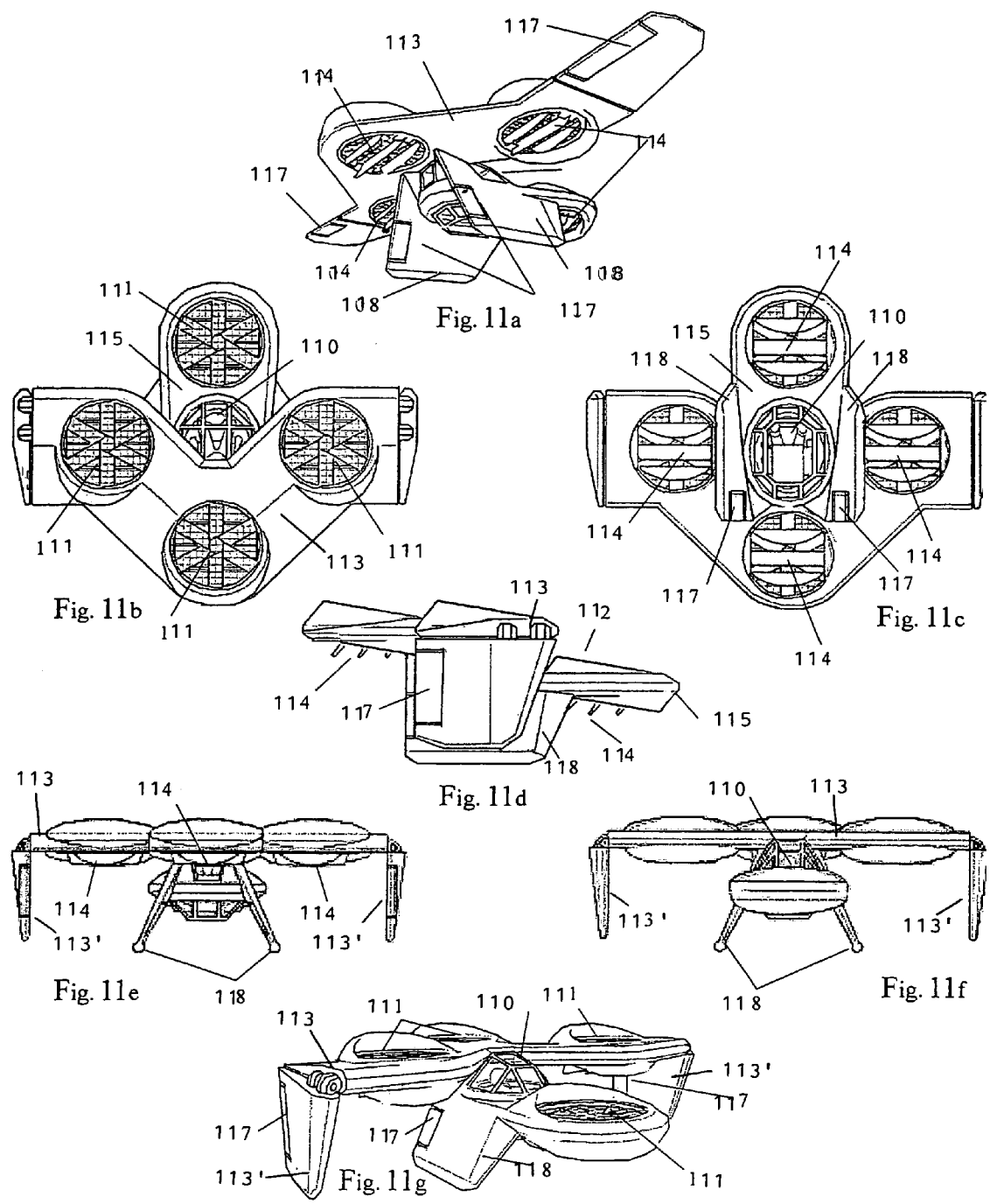

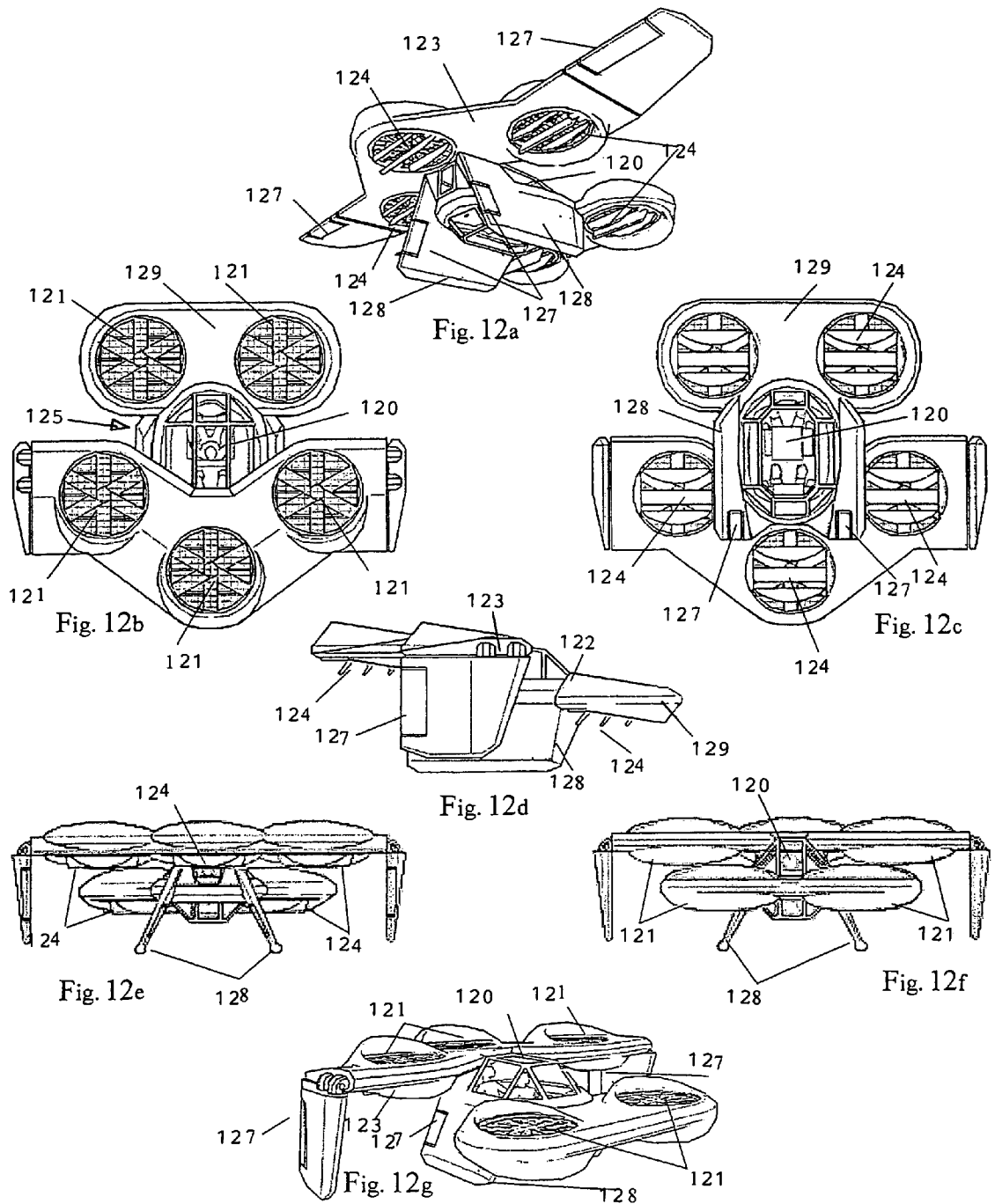

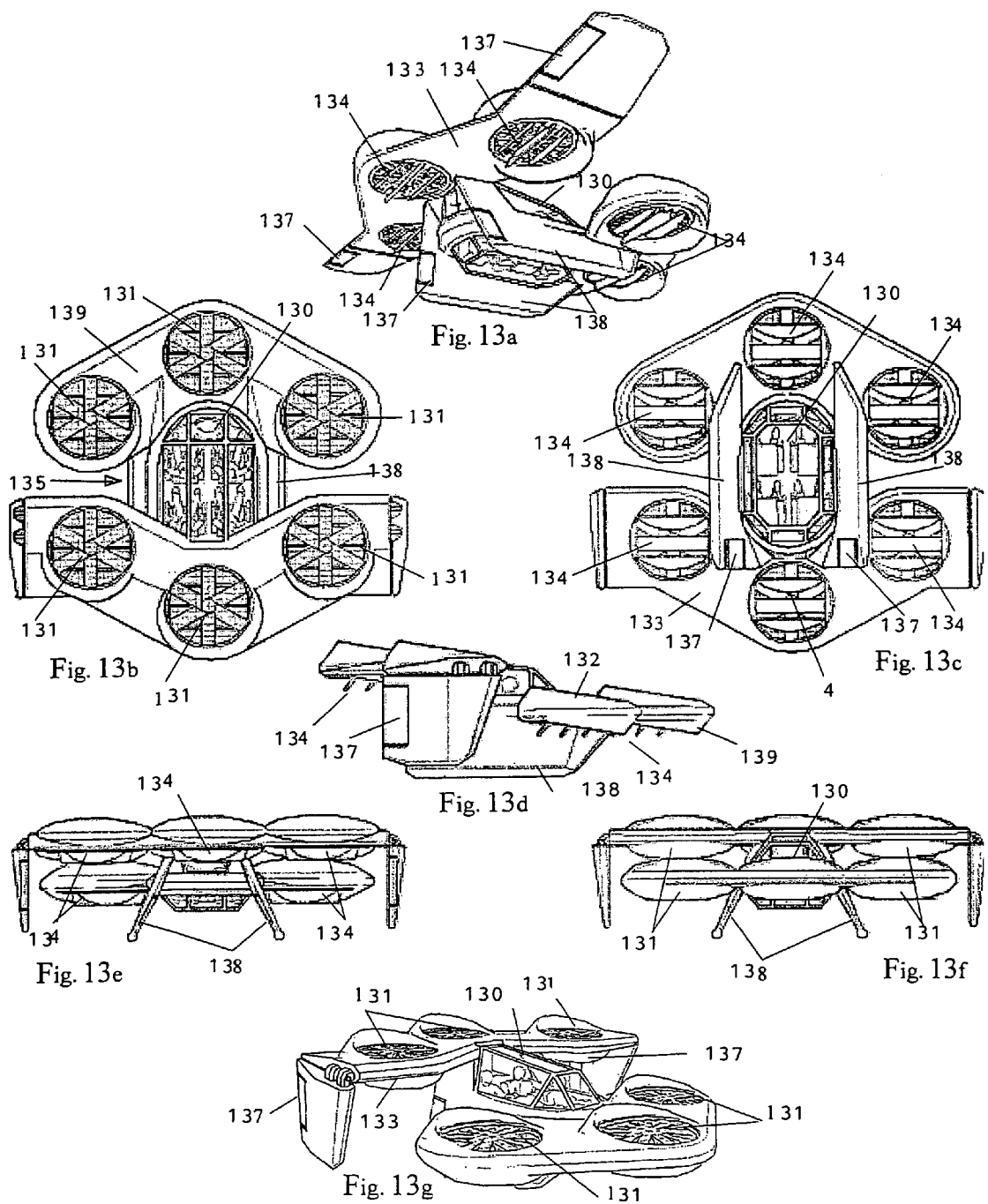

QUIET VERTICAL TAKEOFF AND LANDING AIRCRAFT USING DUCTED, MAGNETIC INDUCTION AIR-IMPELLER ROTORS

This continuation-in-part (CIP) U.S. patent application claims the priority of U.S. Design Patent Application No. 29/175,100 filed on Jan. 22, 2003, entitled "Quiet Vertical Take Off & Landing (VTOL) Aircraft", of the same inventors, and U.S. patent application Ser. No. 10/666,936 filed on Jan. 7, 2002, entitled "VTOL UFO", by the same inventors.

TECHNICAL FIELD

This present invention relates to manned and unmanned vertical takeoff and landing (VTOL) vehicles, and particularly to a ducted, magnetic induction engine used in such VTOL aircraft for vertical, hover and horizontal flight, and to an air vane assembly, steering assemblies, and other flight contols for maneuvering and controlling translational movement of such VTOL vehicles.

BACKGROUND OF INVENTION

There are generally three types of VTOL configurations under current development: wing type configuration having a fuselage with rotatable wings and engines or fixed wings with vectored thrust engines for vertical and horizontal translational flight; helicopter type configuration having a fuselage with a rotor mounted above which provides lift and thrust; and ducted type configuration having a fuselage with a ducted rotor system which provides translational flight as well as vertical takeoff and landing capabilities.

There has been a long list of related developments in aerial vehicles of these types. Most notable pioneers include the Focke-Wulf Fw61 helicopter in 1936, Piasecki's G-1 tilt rotor in 1951, and Hiller who developed their first flying platform in late 1953 under contract with the Office of Naval Research (ONR) for a one-man flying platform. The machine made its first flight in February 1955, and was named the "VZ-1 Pawnee". The Piasecki Air Jeep, described in U.S. Pat. No. 2,282,612, was developed and flown under U.S. Army and Navy contracts between 1957 and 1962.

In the 1960s Wendell Moore developed the well-known Rocket Belt which can still be seen at various air shows to this day. The VZ-9-AV Avrocar, described in U.S. Pat. No. 3,062,482, was funded by both the U.S. Army and U.S. Air Force and was known for its disk shaped which looked very much like a scaled-up modem "Frisbee" toy. Dr. Moller has contributed several designs, the most notable being his M200x, described in U.S. Pat. No. 3,410,507, known for its flying saucer shape and use of multiple engines. These led to a series of small ducted fan unmanned aerial vehicles (UAVs), known as Aerobots, described in U.S. Pat. No. 4,795,111 using a single fan or up to eight ducted fans powered by rotary engines. The Airborne Remotely Operated Device (AROD) was a small, ducted fan, vertical takeoff and landing (VTOL) vehicle developed by Moller as a subcontractor to Perceptronics, which was electrically powered with power supplied through a tether from a ground station. This inspired helicopter-type UAVs like the HoverCam which can hover over a fixed spatial point and takeoff and land vertically but have limitations when operating in confined areas due to the exposed rotors rotating above the fuselage.

More recently, the Bell/Boeing Eagle Eye Tilt Rotor UAV was developed as a scaled down version and derivative of the Bell/Boeing V-22 Osprey. In 1991 the HOVTOL, described in U.S. Pat. No. 5,890,441, demonstrated twin high-power engines capable of both vertical and horizontal flight using ducted fans primarily for vertical lift. Also, the Bombadier CL-327 Guardian VTOL UAV developed in 1996 featured dual, coaxial, contra-rotating, three-bladed rotors. Its design was an evolution of the CL-227 Sentinel, and a follow-on concept, the CL-427 Puma has been proposed. In the late 1980s, Sikorsky Aircraft flew a small doughnut-shaped UAV named Cypher, described in U.S. Pat. No. 5,575,438, which was based on coaxial-rotor technology developed by the company in the early 1970s. The Cyper was clearly a flying platform in general concept. It has a doughnut-shaped shroud that not only improved safety in handling the machine, but it also helped increase lift. The Cypher II, described in U.S. Pat. No. 6,270,038, is of similar size to its predecessor, but has a pusher propeller along with its rotor and can be fitted to a configuration with wings for long-range reconnaissance missions.

Other than the electric-motor-tethered AROD built by Dr. Moller, all past VTOLs, manned or unmanned, have used fuel-burning combustion engines as the means of propulsion. These have the disadvantages of generating high noise and requiring metal engine housings and parts and the weight issues that go with them. High noise and weight preclude the use of such prior vehicles in sensitive reconnaissance missions that require stealth, quick deployment, and maneuverability in close air spaces. The tethered AROD has the problem of limited flight within the radius of the tether to the ground station. Engines with exposed rotors present a high safety risk. Single-engine designs have had the problem of gyroscopic instability, while multiple engine designs have had the problem of managing complicated multi-engine controls.

Current-day anti-terrorist missions would make it desirable to deploy a VTOL UAV that is quiet and can remain aloft for long periods of time (days or weeks) while maneuvering in close air spaces for continuous surveillance of potential combatant targets, military facilities, power plants, important civilian installations, roads, port facilities, etc. While noise and engine safety can be improved by enclosing rotors in ducts or shrouds, and dual, coaxial, contra-rotating rotors can be used for better gyroscopic stability, no previous design has yet offered an optimization of low noise, low weight of engine parts, high fuel-capacity-to-weight ratio for long duration flight, and advantageous engine design providing high gyroscopic stability with maneuverability and ease of flight controls.

SUMMARY OF INVENTION

The present invention solves the problems of the prior VTOL vehicles by providing a novel engine design for quiet, electrically-powered, and highly efficient flight performance. The engine has an air-impeller rotor formed with a plurality of blades with inner ends fixed to a hub and outer ends fixed to a disk or annular shaped outer ring arranged to float on magnetic bearings and driven by electric-powered magnetic induction elements arrayed on the impeller disk and complementarily on the duct housing. The duct housing serves a dual use of isolating the rotor for safety and deflecting or absorbing noise. The engine with air-impeller rotor is arranged vertically to provide thrust for vertical takeoff and landing. A pitch change mechanism is provided to vary the thrust by changing the pitch of the blades. An air vane assembly is used to deflect or direct a portion of the air thrust output of the rotor to provide a horizontal thrust component for horizontal translation and maneuvering. The magnetic induction air-impeller engine may employ dual, modular rotors in coaxial, contra-rotating configuration for increased thrust and gyroscopic stability.

The present invention is also directed to a new class of VTOL vehicles which use one or more of the magnetic induction air-impeller engines for VTOL flight in various military, commercial or recreational applications and with various flight speed and payload capacities. A single-engine vehicle has an annular shape and dual contra-rotating rotors in a central air flow channel adapted for unmanned surveillance or single-seater piloted uses. A two-engine vehicle has the engines on the ends of an elongated fuselage in "flying platform" or "hoverbike." designs. A three-engine vehicle has one engine at a forward apex and the two other engines on a rearward overhead wing for stability in forward flight and high maneuverability. Other multiple-engine designs employ the engines in balanced configuration around the vehicle's center of gravity for increased size, speed, and payload capacity. Side winglets and other rudders and control flaps may be provided on the vehicle for added flight control and stability. An integrated flight control system can be used to operate the various flight control mechanisms.

The high mechanical efficiency of the engine due of the frictionless maglev bearings and magnetic induction drive ensures that sufficient thrust can be generated with high power-to-weight ratio for a given hover aircraft size. Electric power can be supplied to the magnetic induction drives by high-capacity batteries or by hydrogen fuel cells made of lightweight parts. The all electric-powered vehicle can operate with low noise, low heat generation, low weight of engine parts, and a high fuel-capacity-to-weight ratio. The hover aircraft of the present invention is especially suitable for applications requiring easy deployment through vertical takeoff and landing, hover operation for quiet surveillance, maneuvering in close air spaces, and long duration flights for continuous surveillance of ground targets and important facilities requiring constant monitoring.

Other objects, features, and advantages of the present invention will be explained in the following detailed description of the invention having reference to the appended drawings.

BRIEF DESCRIPTION OF DRAWINGS

FIG. 1a is an exploded cut-away perspective view of an unmanned aerial vehicle embodiment of the present invention employing a single impeller-disk engine, and FIG. 1b is an assembled cut-away view thereof.

FIGS. 3a to 3g are bottom perspective, top, bottom, side, rear, front, and top perspective views, respectively, of an embodiment of a single-engine unmanned VTOL aircraft.

FIGS. 5a to 5g are bottom perspective, top, bottom, side, rear, front, and top perspective views, respectively, of an embodiment of a single-engine, dual-rotor unmanned VTOL aircraft.

FIGS. 6a to 6g are bottom perspective, top, bottom, side, rear, front, and top perspective views, respectively, of an embodiment of a two-engine unmanned VTOL aircraft.

FIGS. 8a to 8g are bottom perspective, top, bottom, side, rear, front, and top perspective views, respectively, of an embodiment of a two-engine "hoverbike" type of VTOL aircraft.

FIGS. 9a to 9g are bottom perspective, top, bottom, side, rear, front, and top perspective views, respectively, of an embodiment of a two-engine piloted type of VTOL aircraft.

FIGS. 10a to 10g are bottom perspective, top, bottom, side, rear, front, and top perspective views, respectively, of an embodiment of a three-engine piloted type of VTOL aircraft.

FIGS. 11a to 11g are bottom perspective, top, bottom, side, rear, front, and top perspective views, respectively, of an embodiment of a four-engine piloted type of VTOL aircraft.

FIGS. 12a to 12g are bottom perspective, top, bottom, side, rear, front, and top perspective views, respectively, of an embodiment of a five-engine piloted type of VTOL aircraft.

FIGS. 13a to 13g are bottom perspective, top, bottom, side, rear, front, and top perspective views, respectively, of an embodiment of a six-engine piloted type of VTOL aircraft.

FIG. 19a illustrates the engines being tilted for flight normal to its longitudinal axis.

DETAILED DESCRIPTION OF INVENTION

Figure 2A:
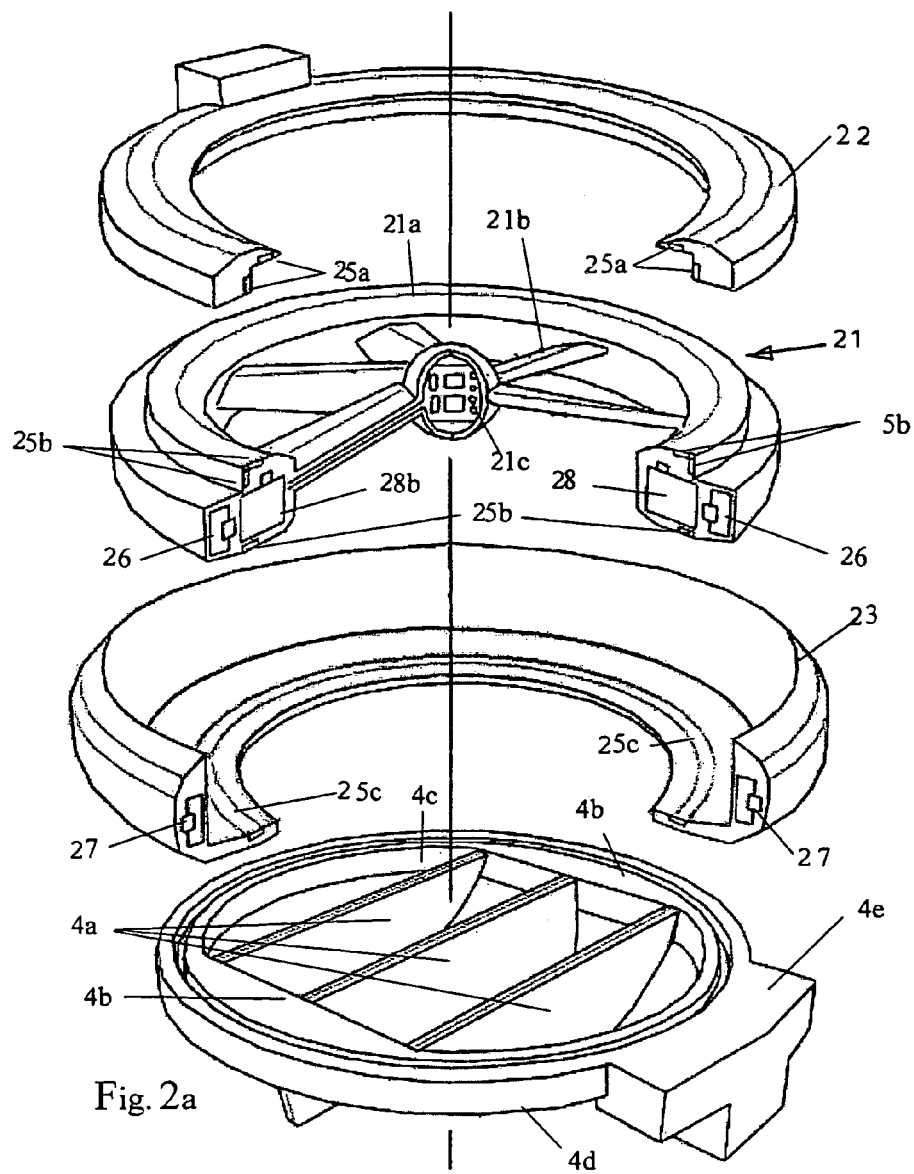
FIG. 2a is an exploded cut-away perspective view of a modified embodiment of the impeller-disk engine.

The present invention is directed to an entirely new class of vertical takeoff and landing vehicles based on a novel engine design using a ducted, magnetic induction air-impeller rotor. The novel engine design provides high gyroscopic stability which allows it to be used in various types of vehicle designs having high maneuverability and ease of flight controls. For simplicity, a basic explanation is given of the magnetic induction air-impeller engine as used in a single-engine design for the VTOL aircraft, followed by description of other variations of the engine design and multi-engine VTOL aircraft designs.

In FIG. 1a, a single-engine embodiment of an unmanned aerial vehicle in accordance with the present invention has an annular or disk-shaped top cap 1a of a main body or fuselage formed with air intake slots 1b and inner ring support 1c for a transparent dome 2 for housing unmanned surveillance equipment therein. The top cap 1a is nested on the main body or fuselage 3 formed with an understructure 3a and a center cone cargo area 3b of the main body. The top cap 1a and fuselage structure together form a hollow annular duct or shroud structure around a center air flow channel for the rotor. The duct or shroud structure isolates the rotor for safety, and also serves as a noise abatement shield. The shrouded walls may be made of sound absorbing or deadening material and shaped in a manner that deflects most of the air thrust noise upward, for quiet (or stealth surveillance) operation with respect to persons on the ground.

The engine has a bottom air vane assembly 4 mounted in the bottom opening of the air flow channel which is formed with one or more vane deflectors 4a, deflector control elements 4b, an inner rotation ring 4c, an outer mounting ring 4d, and an inner ring drive 4e. The ring drive 4e is used to rotate the inner ring 4c to the desired angular position in the horizontal (X-Y) plane for the deflector vane, and the deflector control elements 4b rotate the vane(s) to the desired angular position in the Z-axis direction to provide the desired thrust vector with a component in the horizontal plane. An alternative vane configuration (described below) uses two vanes at right angles to each other with rotational axes lying in the horizontal plane, each having control elements for rotating it in the Z-axis direction to provide together the desired horizontal thrust component. Side air-thrust holes 5 may also be provided at suitable positions around the annular body of the aircraft for diverting air sideways from the air flow channel for counteracting gyro forces on the vehicle when is maneuvered by the air vane assembly for translation movement. For landing, the vehicle may be provided with a tripod of wheeled legs which have an air rudder 6 (on a forward-facing leg) and/or steering flaps 7 (on the back legs) and wheels 8 on the ends thereof.

An impeller rotor having a plurality of blades fixed to a disk-shaped outer ring (described in greater detail with respect to FIG. 2a below) is floated between upper and lower magnetic bearings 15b and 15c for frictionless rotation in the air gap. Upper and lower stator rings 16 and 17 are provided with electric-powered magnetic induction elements for driving the rotor ring into high speed rotation. A drive actuator ring 18 is shown coupling the magnetic induction elements in the upper stator ring 16 to electronic drive controls for the rotor. All vehicle chassis components may be built out of lightweight durable composite or plastic materials. FIG. 1b shows an assembled view of the vehicle chassis.

Figure 2B:
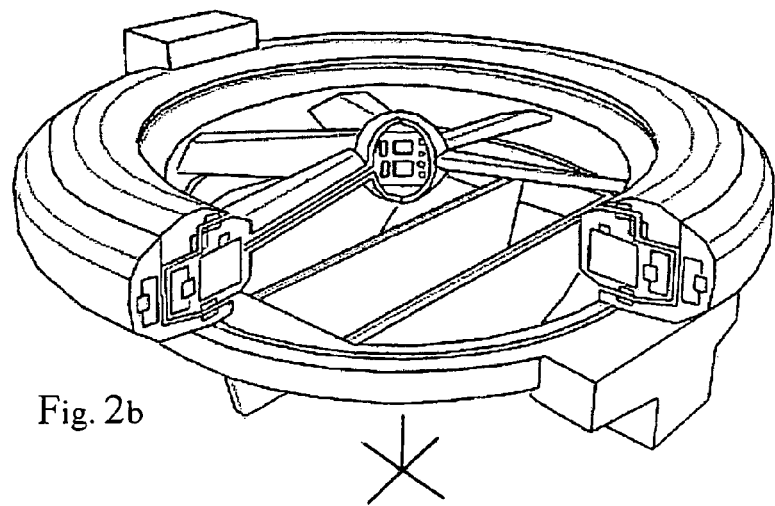
FIG. 2b is an assembled cut-away view thereof.

In FIG. 2a, a more detailed view of a modified embodiment of the impeller-disk engine is shown. The rotor 21 is formed with an outer rotor ring 21a and a plurality of rotor blades 21b. The inner ends of the blades are adjustably mounted to a center hub which has stepper motor drives and electronic pitch controls, designated 21c, housed therein for adjusting the pitch of the rotor blades 21b for varying the output thrust of the rotor. The rotor 21 is levitated between upper stator ring 22 and lower stator ring 23 having magnetic bearing rings 25a and 25c, respectively, which exert balanced repulsion forces on rotor bearing rings 25b. In this embodiment, the rotor 21 is nested within the walls of the lower stator ring 23 and driven by magnetic induction elements 27 reacting with magnetic elements 26 arranged on the facing outer edge of the rotor 21. The lower air vane assembly is similar to the one shown in FIG. 1a, except that this one is shown having an array of three deflector vanes 4a. FIG. 2b shows the magnetic induction engine in assembled view.

Vertical lift for the aircraft is produced by the impeller disk (or disks when in coaxial "stacked" configuration) driving a column of air downwardly through the annular thrust-flow channel in the main body of the aircraft. The air vane assembly at the output of the annular thrust-flow channel is capable of deflecting a part of the developed air flow in varying orientations for controlling the maneuvering of the aircraft in vertical hover flight and/or in horizontal (translation) flight. The aircraft's main body can be designed with an aerodynamic shape to develop lift responsive to forward flight using wings, fins, and/or rudders.

Lightweight high-efficiency magnetic induction drives have been developed and deployed in the transportation industry for monorails, trains, rollercoasters, and other rail-driven vehicles. Such magnetic induction drive technology can be readily adapted to ring-type magnetic induction drives for the air-impeller engines of the present invention. For example, radial-type magnetic induction drives are currently offered by MagMotor, Worcester, Mass., a subsidiary of SATCON Technology Corp., Cambridge, Mass. Linear induction motors (LIM) and linear synchronous motors (LSM) are two variations of electromagnetic propulsion. They do not require any moving parts (other than the driven element) or wearing elements (no brushes or sliding contacts), thereby allowing operation at high rotational speeds, while eliminating friction losses, wear, and excessive heat generation. Typical LIM/LSM systems can drive a vehicle such as a rollercoaster from start extremely quickly, e.g., from 0 to 100 mph in 7 seconds. Its weight can be less than 1/20 the weight of a combustion engine. Engine efficiencies can be several times higher due to the higher power densities and greatly reduced mechanical and heat inefficiencies. Polluting exhaust, dirt particle generation, and the need for lubrication are eliminated. The high energy densities allow their use in environments requiring high duty cycle, high power, rapid acceleration, improved speed and increased performance. Position sensing and control techniques allow for extremely precise control of acceleration and deceleration. The use of ring-type magnetic induction drives in the present invention thus enables operation of the air-impeller engines for the VTOL aircraft with low noise, low friction (and low heat signature), low weight of engine parts, and precise engine control.

The power supply for the magnetic induction drive can be supplied by lightweight high-capacity batteries, which can be recharged using in-flight rechargers such as thin solar panels placed on the body of the aircraft or an external battery charger, or by linear generators. The battery industry, which is driven by the electric transportation and portable consumer electronics industries, is making substantial improvements in lightweight high-capacity battery technology. Promising technologies include nickel metal hydride, lithium-ion, and zinc-air batteries.

Alternatively, the power supply for the magnetic induction engines may be in the form of hydrogen fuel cells which generate electrical output from a controlled chemical reaction of hydrogen with air components. Advanced developments in proton exchange membrane (PEM) fuel cells with radical changes in design, materials, and manufacture are reducing the cost of production and enabling the manufacture of reliable, cost-effective modular fuel cell power units. Polymer electrolyte-based direct methanol fuel cells (DM-FCs), developed at Los Alamos Research Laboratories, use methanol (instead of hydrogen gas) as a fuel source because of its high power density, safety, low cost, ease of handling and distribution, and high electrochemical activity. While hydrogen fuel cells are currently costly in relation to fossil fueled power, steady advances in the transportation, distributed power generation, and portable consumer power industries are driving costs down to competitive ranges. The use of hydrogen fuel cells for the magnetic induction air-impeller engines of VTOL aircraft thus provides significant advantages of no noise, lower heat generation, lightweight component parts, and high fuel-capacity-to-weight ratio for long duration flight.

The unmanned VTOL aircraft can use a standardized teleoperation system (STS) and standardized robotic system (SRS) to control flight and to manage the gathering of surveillance information. The basic payload carried by the vehicle includes optical equipment and sensors, onboard controllers, communications gear, and battery packs or hydrogen fuel supply. The shape and size of the aircraft and engine rating are determined by the type of mission contemplated and payload to be carried. The housing for the stator rings has dual use as the duct housing for the rotor.

The air-thrust engine may employ a pair of rotors in coaxial, contra-rotating configuration for increased thrust as well as high gyroscopic stability.

FIGS. 3a to 3g show another embodiment of a single-engine unmanned VTOL aircraft having optical or sensor equipment 30 and controller 39 within a transparent dome 32 mounted on the top cap 31 of the main body or fuselage 33 incorporating the ducted, air-impeller engine, bottom air flow vane assembly 34, side air thrusters 35, air rudder 36 and steering flaps 37 on the tripod leg supports having wheeled ends 38. Spoilers 31' and a robotic arm 32' (for picking up objects on reconnaissance missions may also be provided.

Figure 4A:
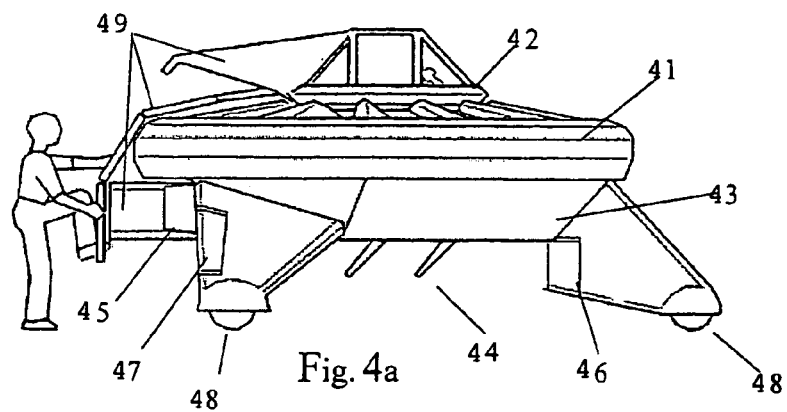
FIGS. 4a to 4c are bottom perspective, top, bottom, side, rear, front, and top perspective views, respectively, of an embodiment of a single-engine manned VTOL aircraft.
Figure 4B:
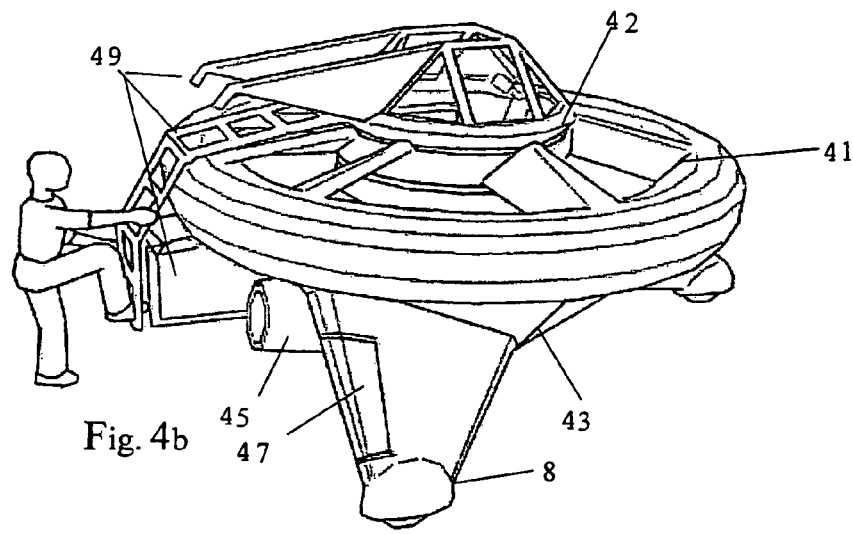
Figure 4C:
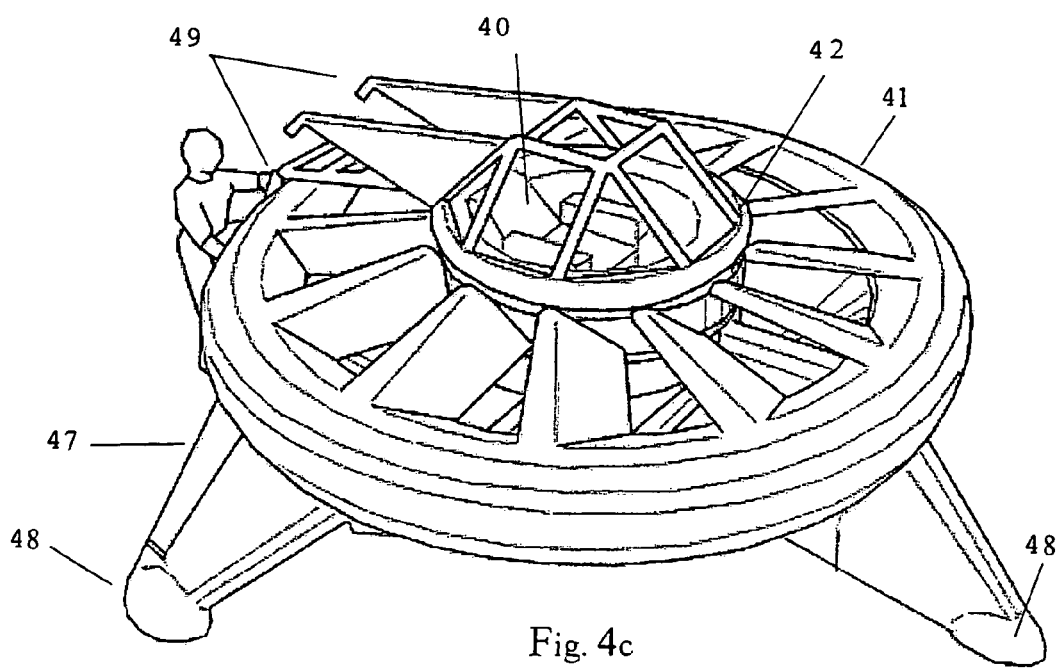
Figure 7B:
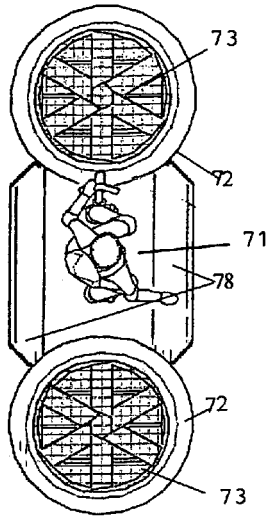
FIGS. 7a to 7g are bottom perspective, top, bottom, side, rear, front, and top perspective views, respectively, of an embodiment of a two-engine "flying platform" type of VTOL aircraft.
Figure 7A:
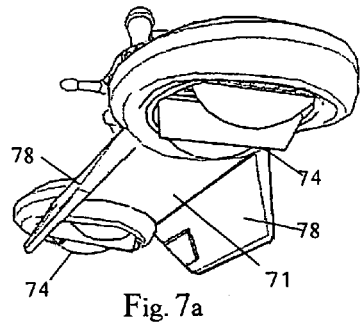
Figure 7C:
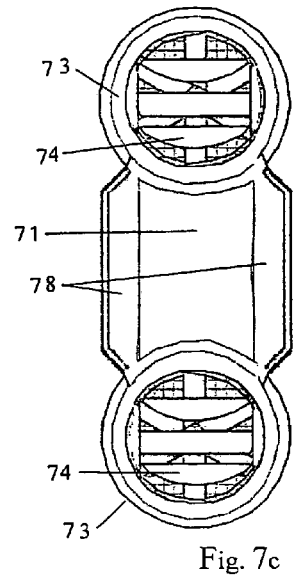
Figure 7D:
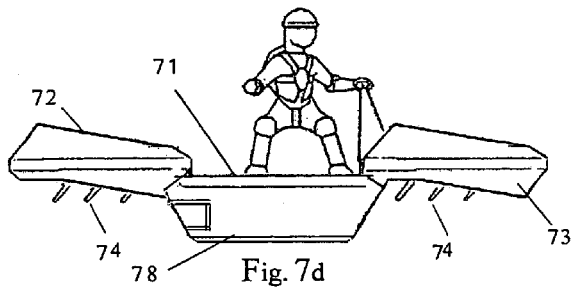
Figure 7E:
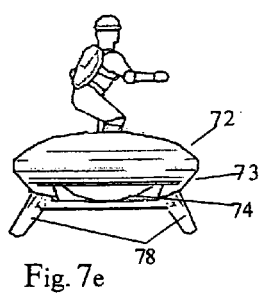
Figure 7F:
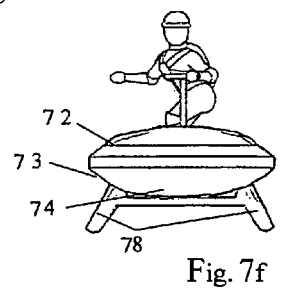
Figure 7G:
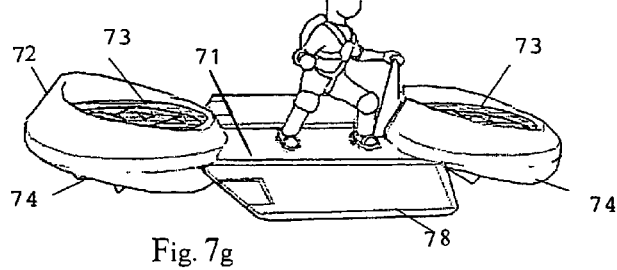

FIGS. 4a to 4c show an embodiment of a single-engine manned VTOL aircraft having a pilot's seat 40 within a cockpit 42 (with rear ladder access) mounted on a top cap 41 of the main body or fuselage 43 incorporating the ducted, air-impeller engine, bottom air flow vane assembly 44, aft air thrusters 45, air rudder 46 and steering flaps 47 on the tripod leg supports having wheeled ends 48. Steering flaps 49 may also be provided aft of the forward-facing direction of the cockpit.

FIGS. 5a to 5g show an embodiment of a single-engine, dual-rotor unmanned VTOL aircraft. Like the Sikorsky Cypher, this engine configuration employs dual, coaxial, contra-rotating rotors 51 and 51' which have offsetting angular momentum due to rotor rotation for gyroscopic stability during turning movements of the aircraft. This VTOL configuration is also designed for high-speed translation movement along a longitudinal main flight axis of the fuselage 53, bottom air vane assembly 54, having forward-oriented air intake cowling 52, air rudders 57 on winglets 58 provided at the sides, and optical and/or sensor equipment positioned at the fore and aft ends 50 where a 360 degree elevational view and 180 degree sweep view are obtained. For landing, the winglets 58 can descend to a lowered position from which front and back sets of landing wheels 58' can be protruded for landing.

FIGS. 6a to 6g show an embodiment of a two-engine unmanned VTOL aircraft in which the engines 63 are positioned at opposite ends of a longitudinal main flight axis of the fuselage balanced about its center of gravity. Each engine 63 has a rotor 63' with a direction of rotation that is opposite that of the other engine in order to mutually counter gyro forces of the other generated during turning movements. The ducts for the engines are designed with intake cowlings 62 oriented toward a forward direction of translation movement. Each engine has a bottom air vane assembly 64. Winglets 68 with air rudders 67 are provided at the sides, and can be lowered for landing. Dual sets of optical and/or sensor equipment are housed within an upper dome 60 and a lower dome 61.

FIGS. 7a to 7g show an embodiment of a two-engine "flying platform" type of VTOL aircraft. Like the previous embodiment, it has engines 73 positioned at opposite ends of a longitudinal main flight axis of the fuselage, forward-oriented intake cowlings 72, and air vane assemblies 74. However, this embodiment is designed to carry a person above the terrain, and a platform area 71 is provided for the person to stand or sit on. For military applications, the aircraft can be used to ferry a soldier above a minefield, across a stream or waterway, or across difficult terrain. For recreational applications, the aircraft may be used to skim above snowfields, bodies of water, or open terrain. Winglets 78 are provided for aerodynamic stability and can also be used for landing skids.

FIGS. 8a to 8g show an embodiment of a two-engine "hoverbike" type of VTOL aircraft. Like the previous embodiment, it has engines 83 positioned at opposite ends of a longitudinal fuselage, forward-oriented intake cowlings 82, air vane assemblies 84, and winglets 88 for air stability and use as landing skids. This embodiment is designed to be ridden by a person with high maneuverability over and around obstacles, and therefore has a seat 80 and a handlebar 81 for steering and flight control.

FIGS. 9a to 9g show an embodiment of a two-engine piloted type of VTOL aircraft. Like the previous embodiment, it has engines 93 positioned at opposite ends of a longitudinal fuselage, forward-oriented intake cowlings 92, air vane assemblies 94, and winglets 98 (with rudders 97) which are movable to an upward position for flight and a downward position for use as landing skids or with extendable landing wheels. This embodiment has a cockpit cabin 91 which has upper windows as well as a transparent floor for total aerial viewing by the passenger or passengers.

FIGS. 10a to 10g show an embodiment of a three-engine piloted type of VTOL aircraft. The three engines 101 are positioned in triangular fashion balanced about the center of gravity of the main body 105 of the vehicle. The triangular configuration is particularly advantageous for stable flight and maneuvering (see explanation of flight operation below) with one engine at the forward apex of the triangle oriented in a forward flight direction and the other two spaced apart on an overhead wing 103. Each engine has intake cowling 102 and air vane assemblies 104, as described previously. The overhead wing 103 has an airfoil cross-sectional shape to provide lift in the forward direction, so that the air thrust of the engines can be used more for creating thrust in the forward translational direction for high speed flight. The overhead wing 103 can be designed with foldable ends 103' which act as skids on landing 94, and allow for compact storage. Side winglets 108 and rudders 107 may be provided for aerodynamic stability and steering. The cockpit cabin 100 has upper windows and a transparent floor for total aerial viewing.

FIGS. 11a to 11g show an embodiment of a four-engine piloted type of VTOL aircraft. This design employs four engines 111 in a cross configuration balanced about the center of gravity of the main body 115 of the vehicle, with one engine at the forward apex oriented in a forward flight direction and the other three spaced apart in triangular positions on a V-shaped overhead wing 113. As in previous embodiments, the vehicle has engine intake cowlings 112, air vane assemblies 114, side winglets 118, and air flaps or rudders 117. The overhead wing 113 has foldable ends 113' which act as landing skids and allow for compact storage. The cockpit cabin 110 has upper windows and a transparent floor for total aerial viewing.

FIGS. 12a to 12g show an embodiment of a five-engine piloted type of VTOL aircraft. This design employs five engines 121 in pentagonal configuration balanced about the center of gravity of the main body 125 of the vehicle, with two engines on the ends of a forward canard 129 and the other three spaced apart in triangular positions on a V-shaped overhead wing 123. As in previous embodiments, the vehicle has engine intake cowlings 122, air vane assemblies 124, side winglets 128, and air flaps or rudders 127. The overhead wing 123 has foldable ends which act as landing skids and allow for compact storage. The cockpit cabin 120 has upper windows and a transparent floor for total aerial viewing.

FIGS. 13a to 13g show an embodiment of a six-engine piloted type of VTOL aircraft. This design employs six engines 131 in hexagonal configuration balanced about the center of gravity of the main body 135 of the vehicle, with three engines in forward V-configuration on a forward canard 139 and the other three spaced apart on a V-shaped overhead wing 133. As in is previous embodiments, the vehicle has engine intake cowlings 132, air vane assemblies 134, cockpit 130, side winglets 138, and air flaps or rudders 137. The use of multiple engines multiples the lift capacity of the vehicle for use as a multi-passenger vehicle or large load-carrying capability. Other multi-engine configurations may be designed depending on the desired payload capacity, application, and flight characteristics.

MAGNETIC INDUCTION AIR IMPELLER ENGINE DESIGN AND OPERATION

The following describes in greater detail examples of designs for the magnetic induction air impeller engine which is used for manned and unmanned VTOL aircraft. The engine is designed to be lightweight, modular, self-contained, and capable of operation at high rotational speeds. The engine assemblies are to be built out of rigid, durable lightweight materials, such as metal alloys, composites, synthetic fibers, and/or plastics. The layout of components of the engine designs described herein may differ from the embodiments described previously, and should be viewed as alternate or modified designs which may be used.

Figure 14:
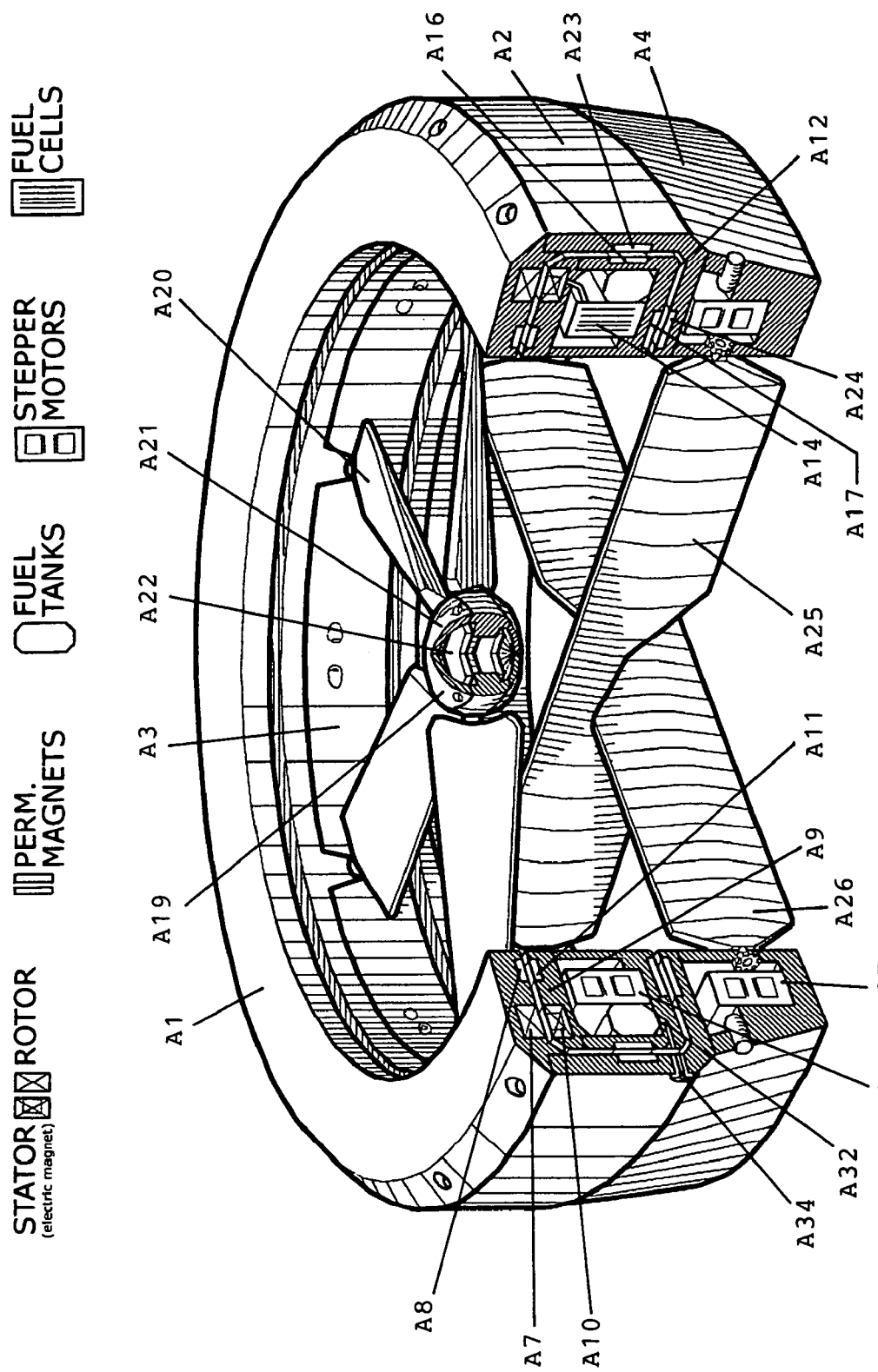
FIG. 14 illustrates a basic air-impeller engine design.

Referring to FIG. 14, the basic air-impeller engine design has a fixed top shroud A1, rotatable impeller disk A3, fixed bottom shroud A2, and a steering vane assembly A4. The top shroud A1 is fixed or bonded to the walls of the bottom shroud A2, and houses one part of a linear induction assembly A7 and a permanent magnet ring A8. The impeller disk A3 is formed as a hollow toroid with an upper wall A9 capping a U-shaped ring A12 formed with outer and inner walls and a bottom wall surrounding a hollow annular cavity., The upper wall A9 of the impeller disk A2 houses the other part of a linear induction assembly A10 and another permanent magnet ring A11. The upper wall A9 is positioned facing opposite the facing wall of the top shroud A1, so that they are separated from each other by a small air gap maintained by the mutual repulsion forces between the opposing permanent magnet rings A8 and A11 on the respective sides. Similarly, air gaps are maintained by repulsion forces between the magnet ring A16 of the bottom shroud A2 and the magnet ring A23 of the impeller disk ring A12, as well as between the magnet ring A24 of the bottom shroud A2 and the magnet ring A17 of the impeller disk ring A12.

Each part (half) of the linear induction assembly A7, A10 is composed of an array of electromagnetic elements having a ferromagnetic core wound with a conductor winding. When an electrical impulse is supplied to the conductor winding of an electromagnetic element in one array, an intense magnetic induction field is generated by that element with a predetermined magnetic orientation. At the same time the complementary element in the other array is energized to generate an intense magnetic induction field of the opposite magnetic orientation. Energization of the electromagnetic elements in the complementary arrays is timed so that it occurs when the elements in one array are positioned rotationally with respect to those in the other array as to maximize the repulsion force between them, thereby driving the impeller disk in one direction of rotation (direction of the arrow in the figure). By controlling the amplitude and timing of impulse energization of the complementary arrays of magnetic induction elements, the acceleration, rotational speed, and deceleration of the rotor can be controlled. The operation and mechanics of magnetic induction drives are well known to those skilled in the field and are not described in further detail herein.

Figure 15:
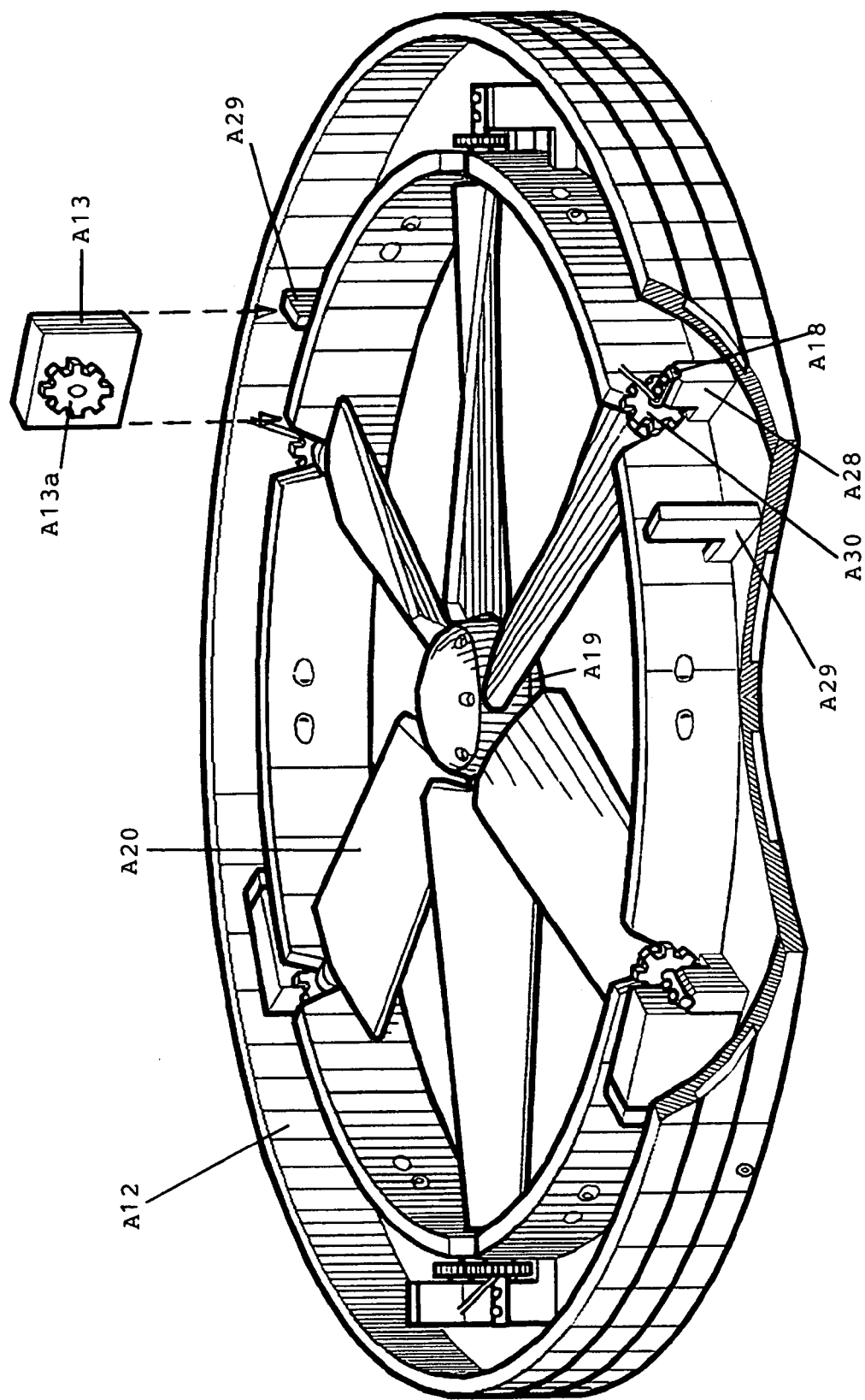
FIG. 15 illustrates a self-contained structure for varying the pitch of the rotor blades.

The thrust force of the rotor is determined by the speed of the rotor, and by the number and pitch of the blades. For the large acceleration forces required for takeoff of the vehicle, it is desirable to have rotor blades which can be changed in pitch for greater force in air displacement per revolution of the blades. Referring to FIG. 15, a self-contained structure for varying the pitch of the blades A20 is shown carried within the hollow annular cavity of the impeller disk ring A12. The blades are fixed to linear support rods A18 which have their inner ends supported in the rotor hub A19 and their outer ends journalled in a support block A28. A driven gear A30 is fixed to the outer end of each blade support rod A18. A stepper motor drive A13 is provided at the terminal end of each of the support rods for the rotor blades A20, with its drive gear A13a meshed in contact with the driven gear A30 on each rod. The stepper motor drive is held in place between the divider wall A29 and the support block A28.

Figure 16:
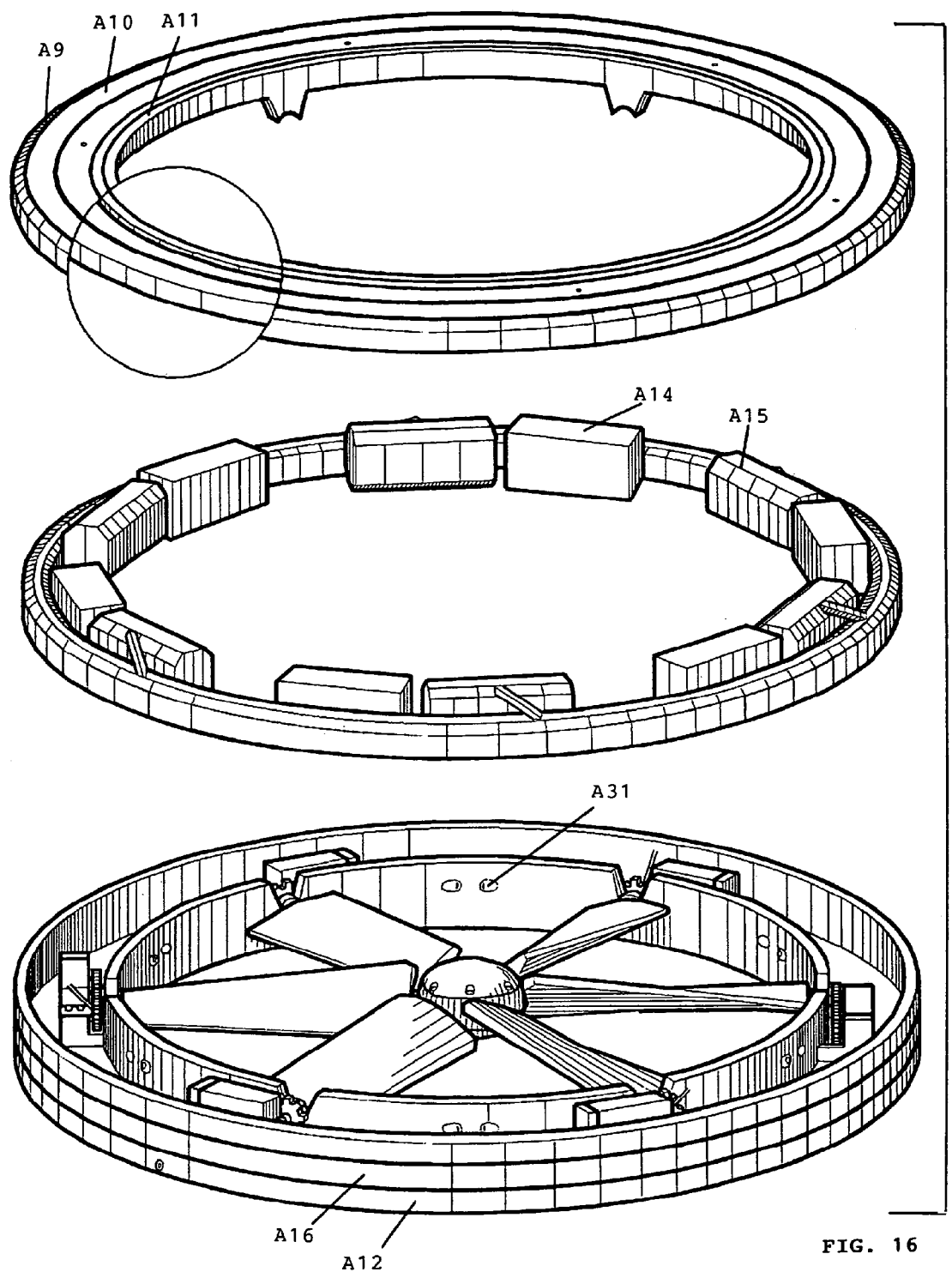
FIG. 16 illustrates assembly of on-board power supplies in the impeller disk for varying the pitch of the rotor blades.

Referring to FIG. 16, the hollow annular impeller disk ring A12 is also assembled with power supplies for driving the stepper motor drives, including respective batteries A15 and actuator control boards A14 for each blade support rod position. Control signals to actuate the stepper motor drives for changing the pitch of the rotor blades can be provided by wireless signal transmission to control relays mounted with the actuator control boards A14 and/or redundantly with control relay boards A22 housed in the rotor hub A19 (covered by caps A21) and connected to the actuator control boards A14 by wires passed through the rotor blade structures. In the alternative, fuel cells may be used in place of the batteries A15. Residual heat and vapor byproducts of the fuel cells are vented by exhaust vents A31. The batteries may be recharged or the fuel cells may be resupplied with fuel during maintenance intervals without disassembly of the engine shroud through resupply ports A34 in the bottom shroud wall and impeller disk passages A32. By carrying on-board power supplies for actuating the rotor blade pitch changes, the rotor is made entirely self-contained without the need for maintaining power supply contacts to an external source during operation of the rotor. The added weight in the impeller disk ring also increases its gyroscopic stability when driven by the magnetic induction drives.

Referring again to FIG. 14, the steering vane assembly A4 is mounted below the air-impeller engine assembly for directing the downward air flow with an angular thrust vector for maneuvering or translation movements in the horizontal plane. The modified steering vane assembly shown has one variable-pitch vane A25 rotating on an "X" axis and another one A26 rotating on a "Y" axis for generating a thrust vector of any desired amplitude and vector angle in the horizontal plane. The rotational movements of the vanes are controlled by stepper motor drives A27.

Figure 17:
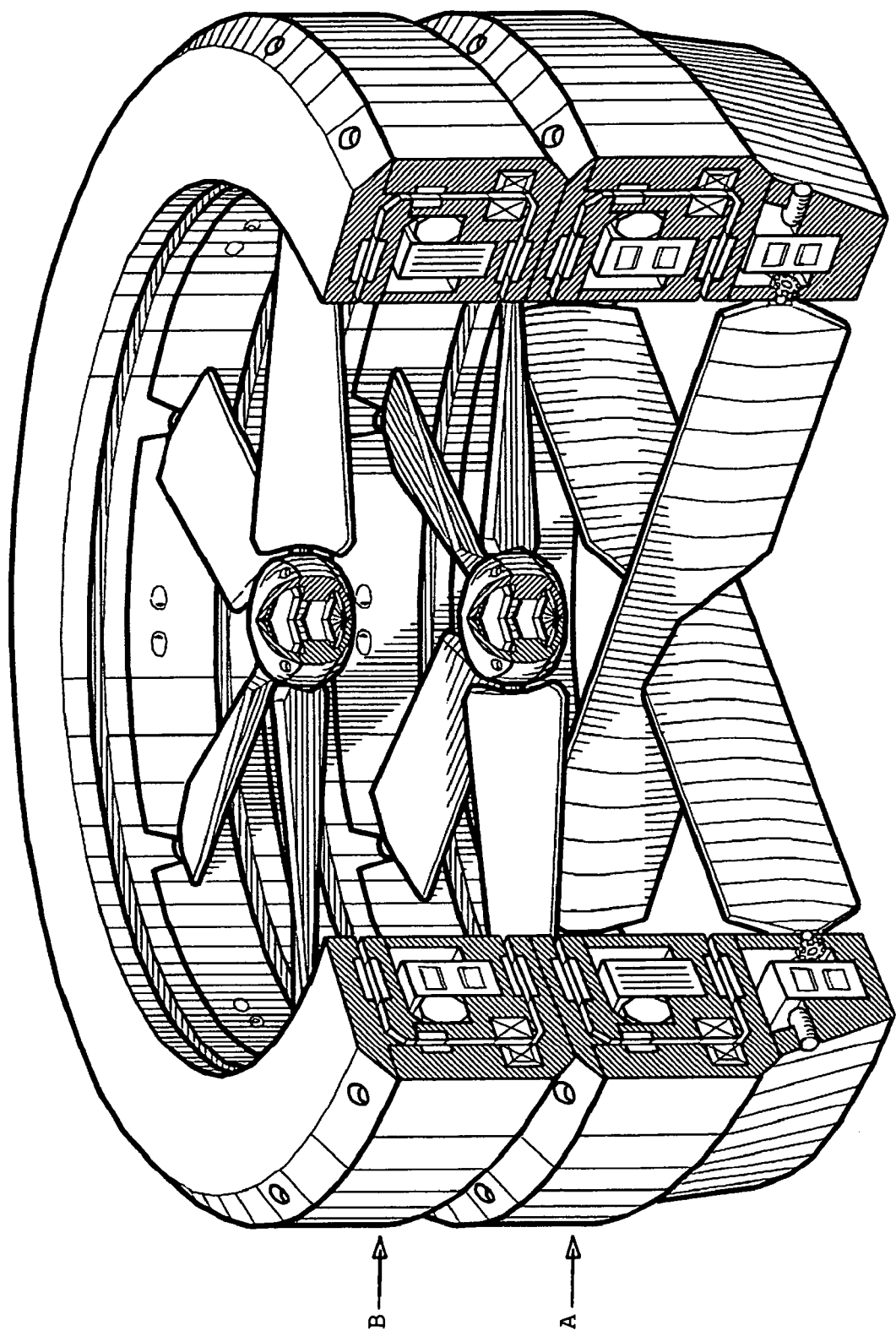
FIG. 17 illustrates an air-impeller engine having two contra-rotating rotor rings A and B stacked in modular fashion

In FIG. 17, an air-impeller engine is shown having two contra-rotating rotor rings A and B stacked in modular fashion coaxially one on top of the other, with a steering vane assembly below them. The combined contra-rotating rotors generate a greater total thrust and have counter-balancing angular momentum for neutralizing gyroscopic forces during turning movements of the aircraft. It thus provides a very stable engine configuration for the VTOL craft, whether single or multiple engine design, and does not need a compensating tail rotor or thruster.

Figure 18A:
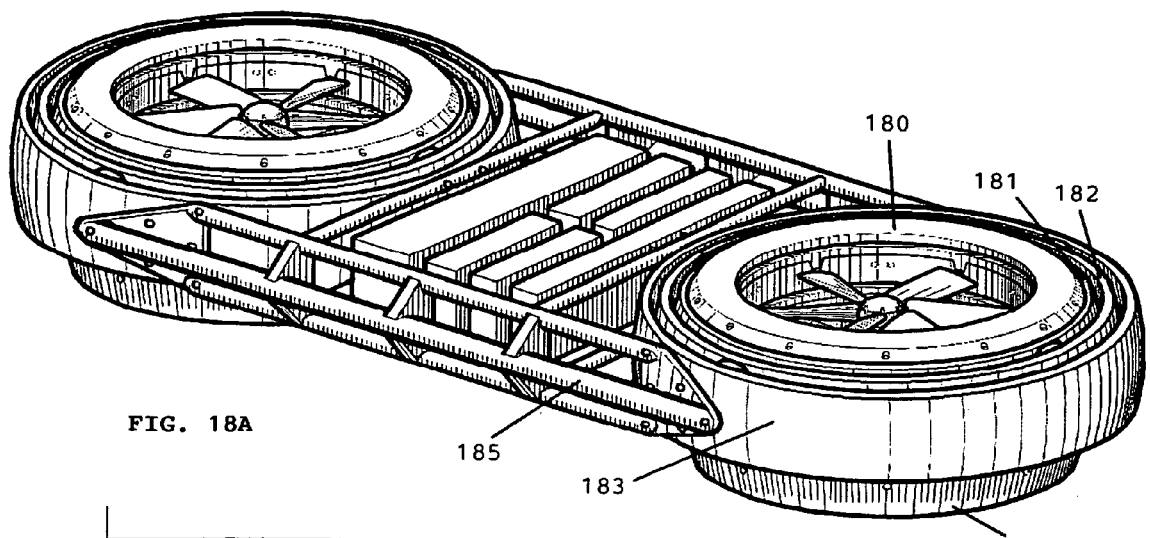
FIG. 18a shows a perspective view and FIG. 18b shows an overhead view of a tilting mechanism for the air-impeller engine on a two-engine VTOL vehicle.
Figure 18B:
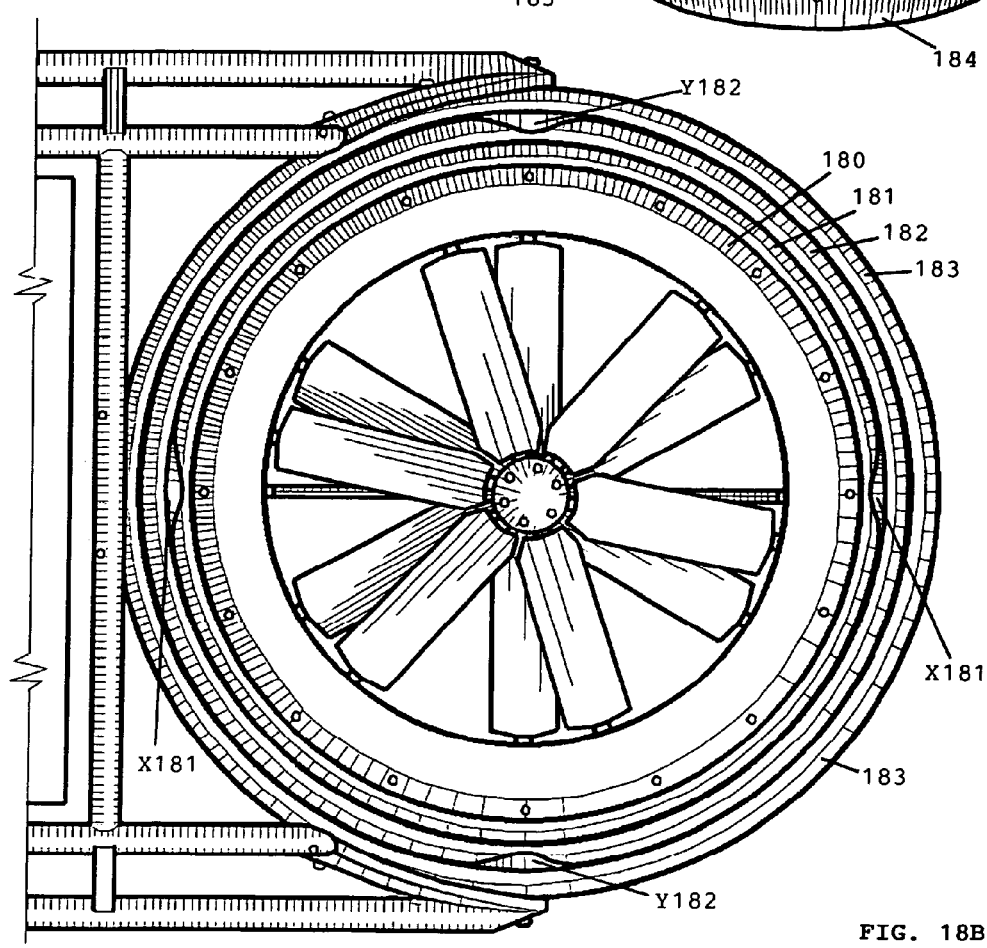
Figure 19A:
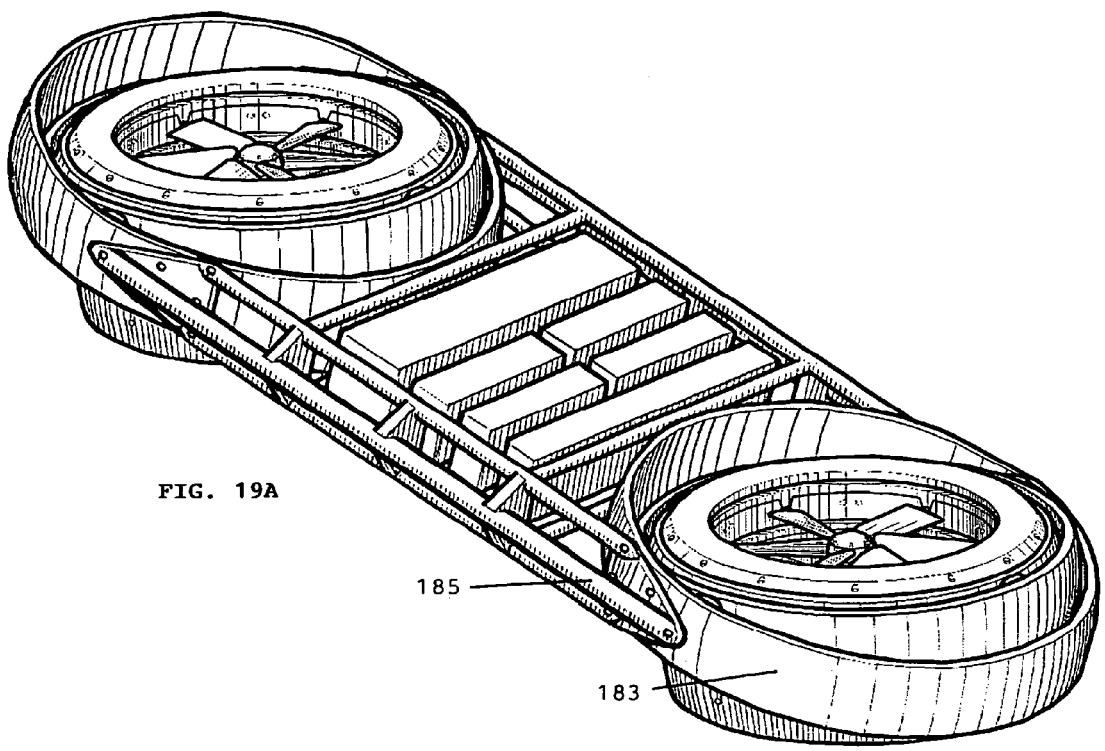
FIG. 19a illustrates the two-engine vehicle having the engines tilted for flight in parallel with its longitudinal axis.
Figure 19B:
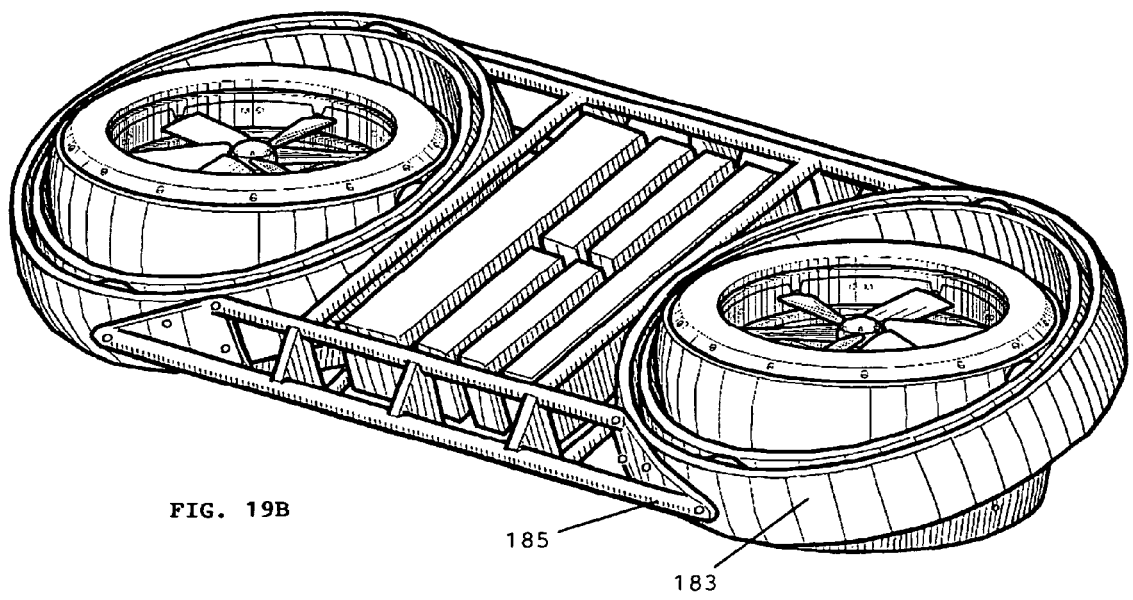
Figure 20A:
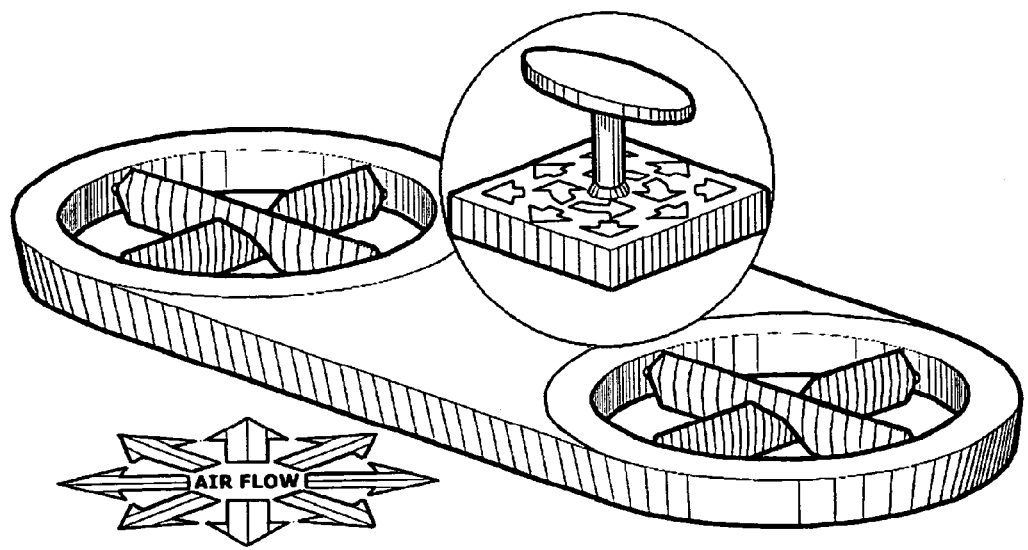
FIGS. 20a to 20k illustrate a joystick control that can be used to control the steering vane assembly to control the flight direction of the VTOL vehicle.
Figure 20B:
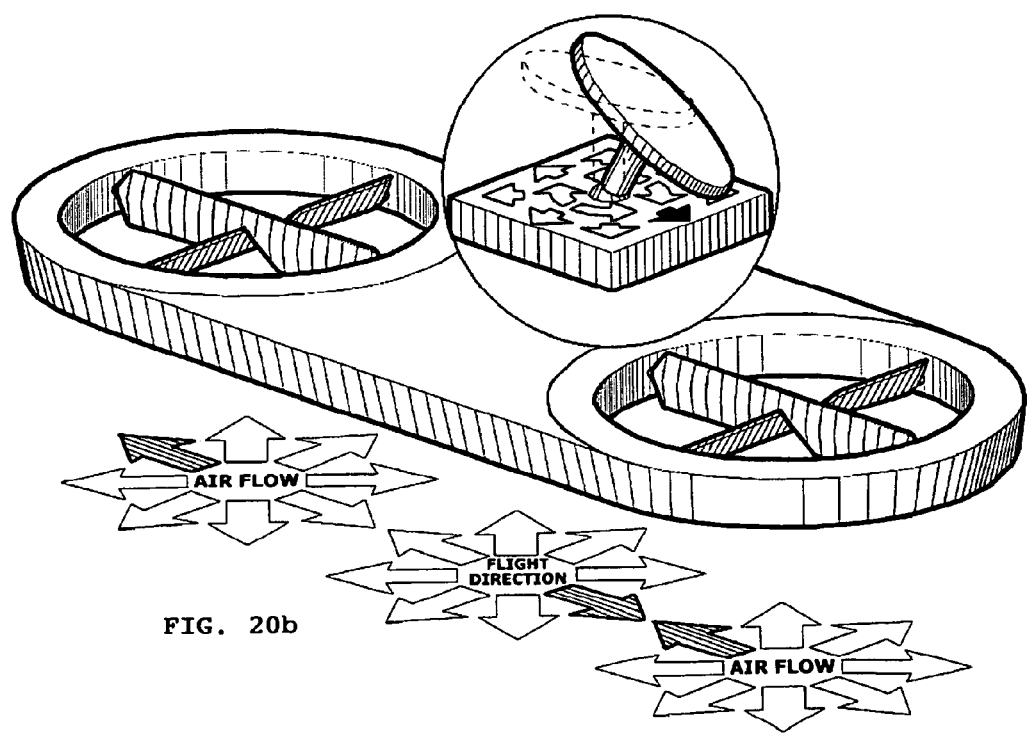
Figure 20C:
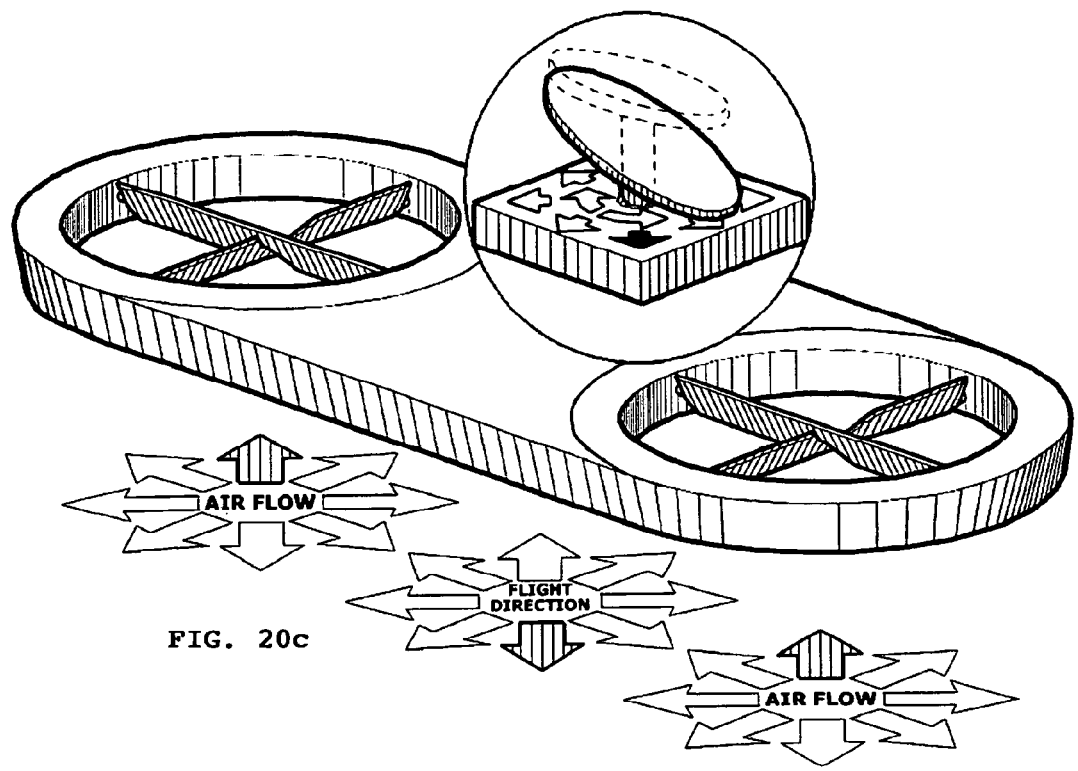
Figure 20D:
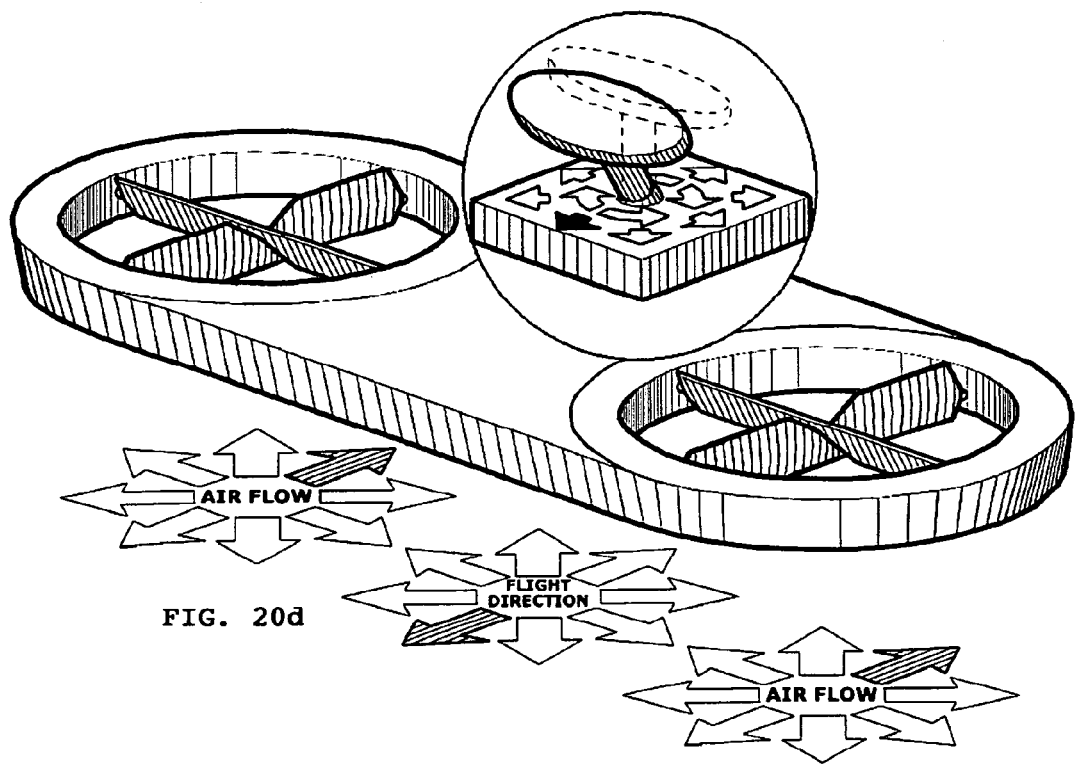
Figure 20E:
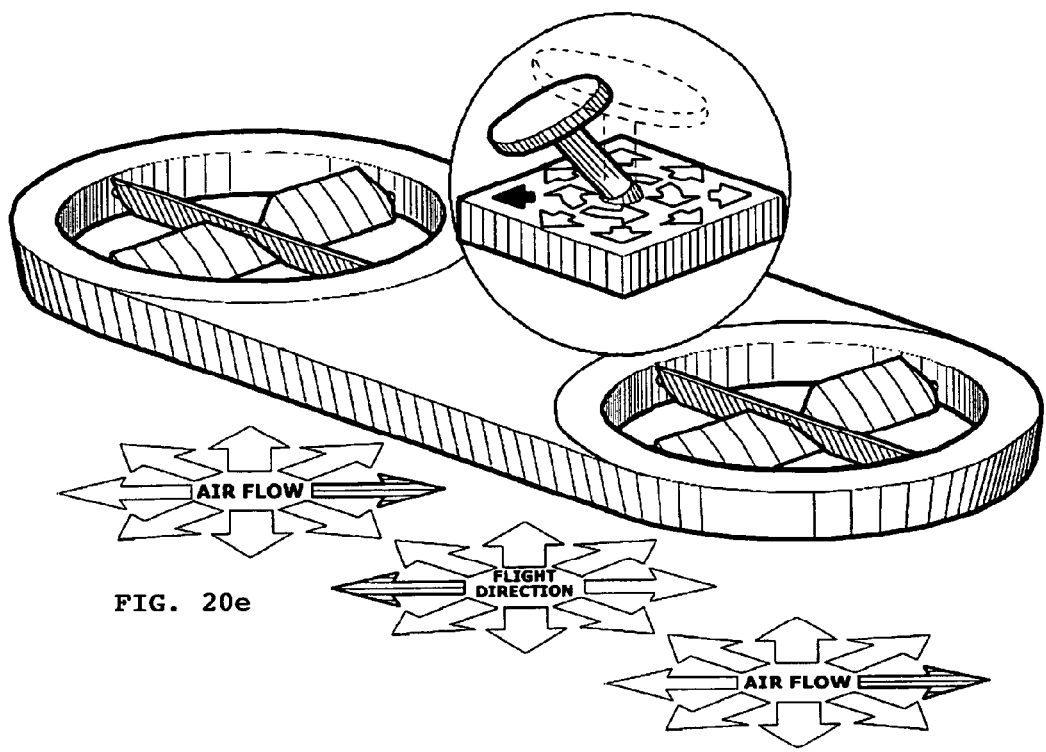
Figure 20F:
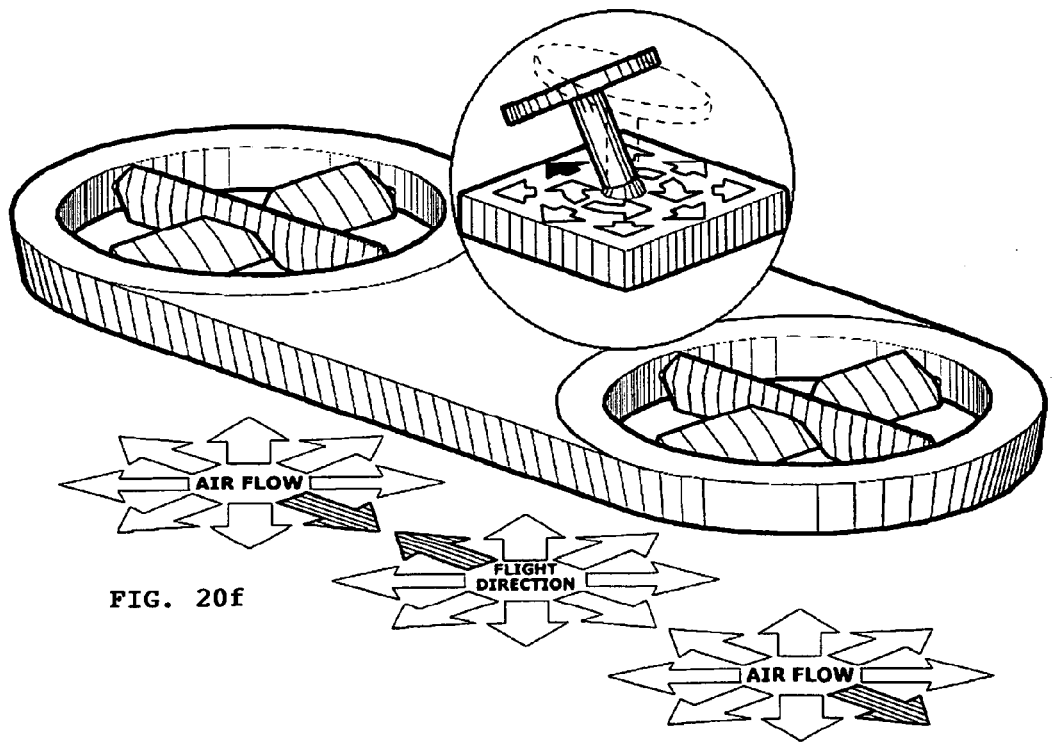
Figure 20G:
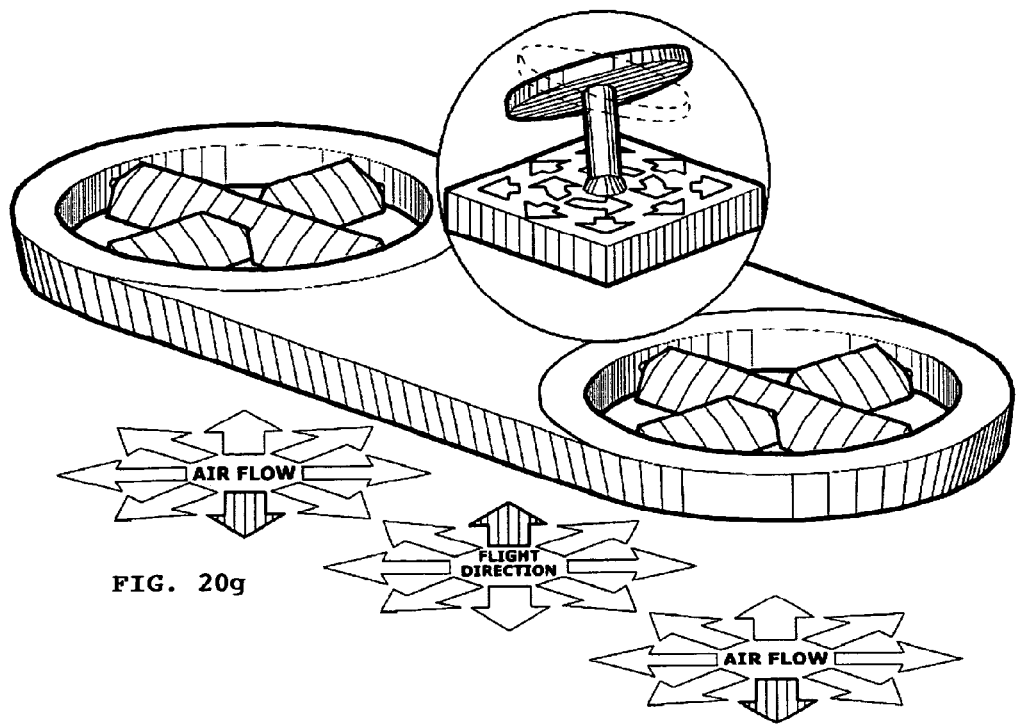
Figure 20H:
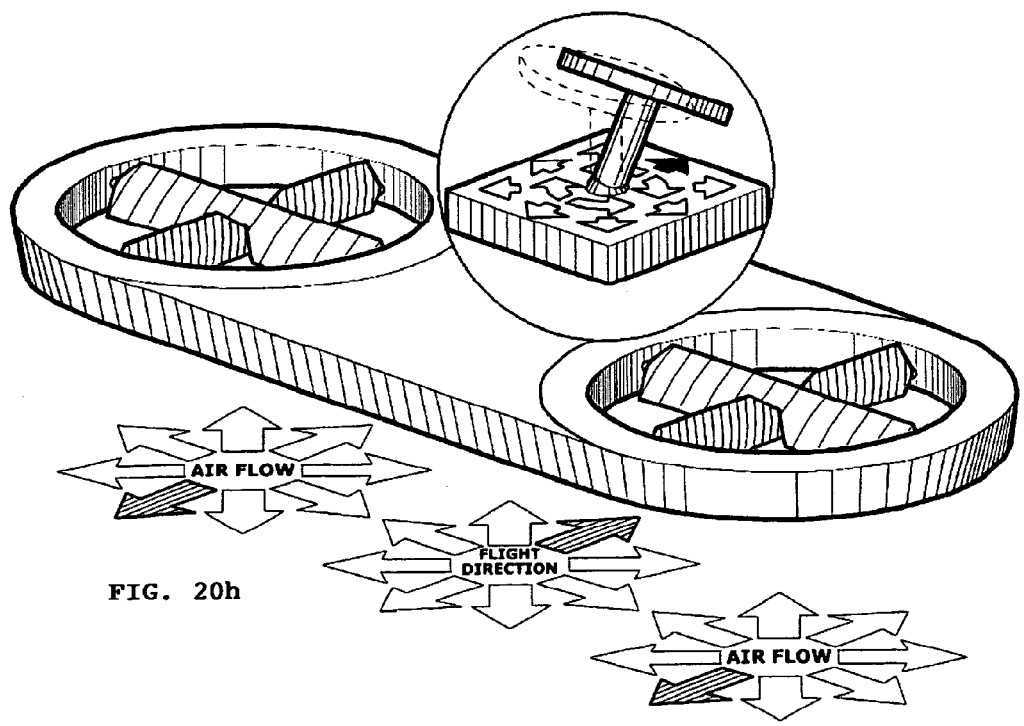
Figure 20I:
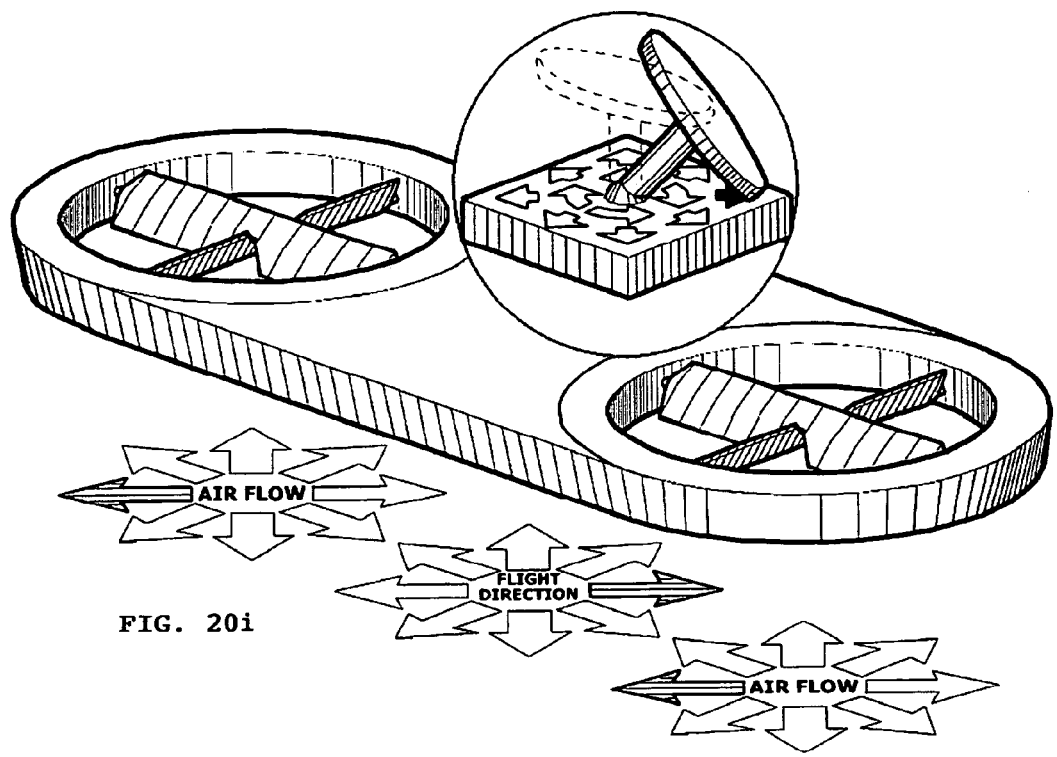
Figure 20J:
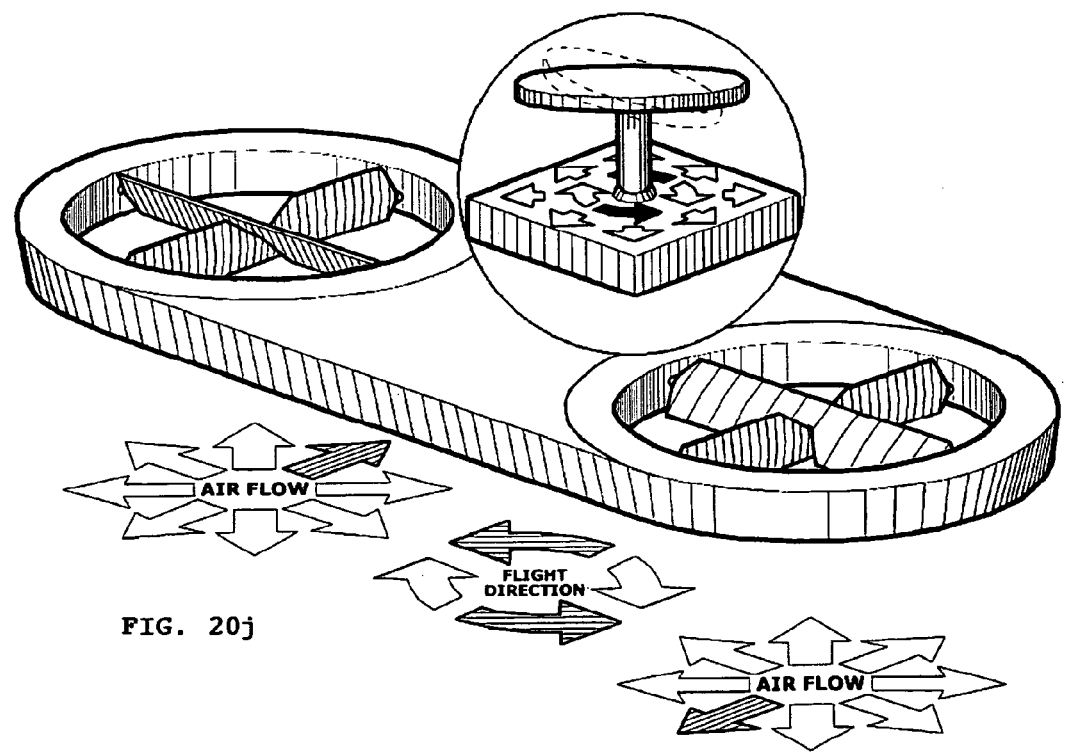
Figure 20K:
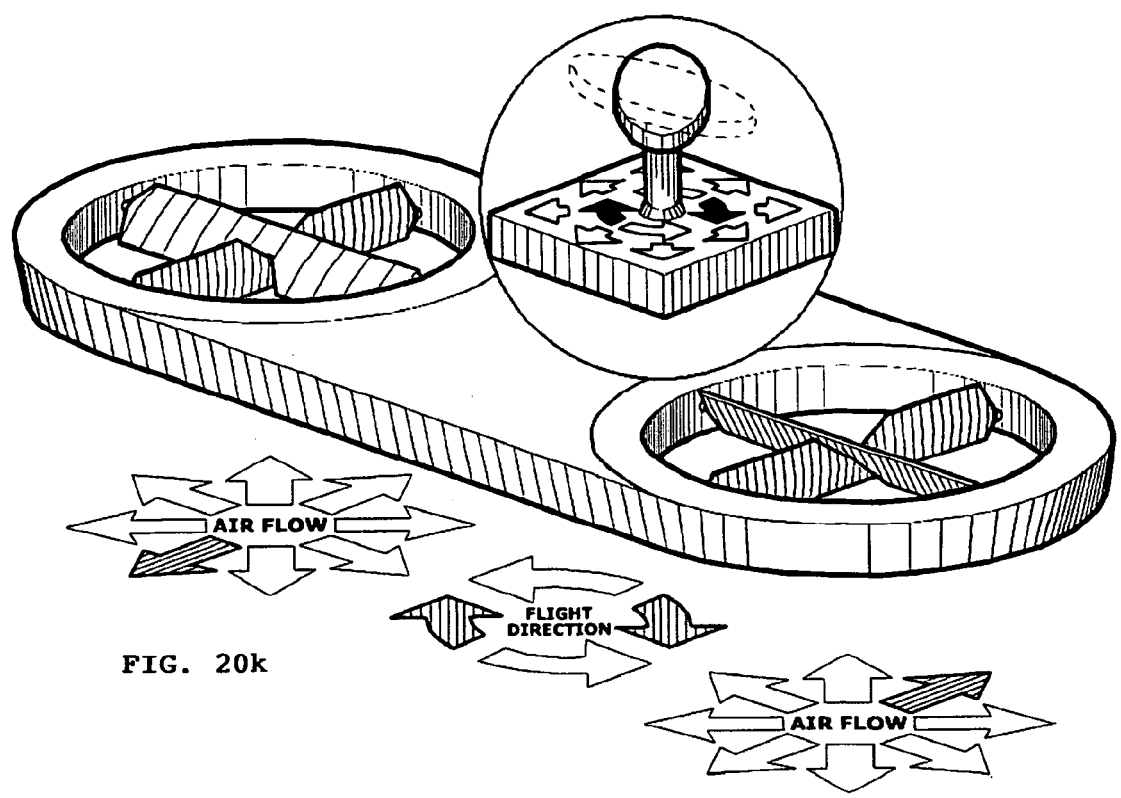

An alternative to steering the VTOL vehicle in translation movement is a tilting mechanism for the air-impeller engine shown for a two-engine vehicle in the perspective view of FIG. 18a and overhead view in FIG. 18b. The engines 180 are mounted at end positions to a chassis frame 185. Each engine 180 is mounted to an inner shell 181 which can be tilted on an "X" axis by an opposing pair of X swivel drives X181 mounted to a second shell 182. The second shell 182 can be tilted on an "Y" axis by an opposing pair of Y swivel drives Y182 mounted to a third shell 183. The third shell 183 is mounted fixedly to the chassis frame 185. By actuating the swivel drives X181 and Y182, the engine 180 can be tilted to output an air thrust vector in any angular direction and with a horizontal component based on the amplitude of the tilting movements. FIG. 19a illustrates the two-engine vehicle having the engines tilted about 20 degrees to generate a thrust vector for flight in parallel with its longitudinal axis, and FIG. 19a illustrates the engines being tilted about 20 degrees to generate a thrust vector for flight normal to its longitudinal axis.

FIGS. 20a to 20k illustrate a joystick control that can be used to control the steering vane assembly to control the flight direction of the VTOL vehicle. The series of figures demonstrates how the joystick control changes the relationship and the pitches and directions of the "X" and "Y" steering vanes to generate a thrust vector component for horizontal maneuvering or translational movements. A similar joystick control can be implemented for the alternative mechanism using "X" and "Y" swivel drives for tiling the engine(s). For a piloted vehicle, the joystick control can be used to control the direction of the aircraft, while a footpedal can be used to control the rotational speed and pitch of the blades of the air-impeller engine. A flight control CPU can be used to implement the magnetic induction drive changes, blade pitch changes, and steering vane changes in response to the pilot's joystick and footpedal inputs.

Flight Operation Requirements and Vehicle Characteristics

The single and multiple air-impeller engine designs for the VTOL aircraft of the present invention raise challenging new issues in fluid mechanics, aerodynamics, maneuverability, and dynamic stability of the aircraft. A study was made of the required thrust and control parameters for operating the VTOL aircraft, and design of the energy source and packaging for this type of aircraft. The study assumed the following parameters for a prototype aircraft:

Physical dimensions of the aircraft: 5' (H)×6' (W)×16' (L)
Total weight of aircraft: 400 lbs
Number of impeller disks: 2 (positioned at longitudinal ends)
Impeller disk: 4' in diameter, 6 blades, operable at speeds of up to 5 k to 10 k RPM The study found that shrouded fan designs, like the present ones, have lower power requirements than an open rotor to produce the same amount of lift. The impeller consists of 6 blades. The linear velocity at the tip of the blade will be given by:

$$Utip = \omega D/2 = 2\pi n/60 D/2$$

where $\omega$ is the rotational velocity in rads/s and D is the diameter of the impeller. This formula implies velocities between 314 m/s to 628 m/s if the blades are rotated at speeds of 5k and 10k rpm respectively. In this operational range of rpm the blade tip velocities are higher than the speed of sound and part of the blade will be in the transonic or supersonic regime which will generate shock waves moving in front or on top of the blade with substantial penalty in the performance of the impeller and the appearance of higher noise levels. Operation under theses conditions is therefore not recommended, since the required lift/thrust can be obtained at lower rpm. The maximum recommended rotational speed is 3,600 rpm, which will induce flows with Mach number below 0.7 at the tip of the blade with velocities up to 230 m/s. As an example, the structural load of the centrifugal force $Utip2/D/2$ on the blade in the case of 10,000 rpm will be 67,000 g, where g is the acceleration of gravity, while in the case of 3,600 rpm it will be only 885g. This large difference would have an impact on the structural integrity of the blade and therefore the selection of material.

Figure 21:
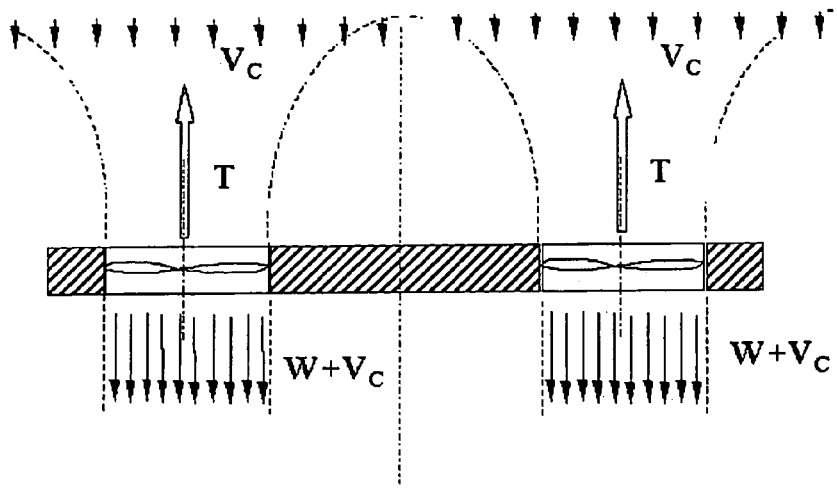
FIG. 21 illustrates a flow model used to analyze the flight operation characteristics of a VTOL aircraft in accordance with the present invention.

The flow model used to analyze the case of a hovering aircraft is shown in FIG. 21. Assuming the aircraft is flying vertically with velocity VC, the boundaries of the flow domain upstream (above) of the rotors are as shown in the figure. Ideally the flow will be drawn from an infinite upstream space but practically this will be restricted to something very close to what is shown. The issue of interference between the two flow domains in the region upstream of the two rotors can be addressed later in design of the aircraft. In the case of vertical flight with constant velocity VC, the total thrust 2T has to counter balance the weight B and the aerodynamic resistance AR acting in the opposite to motion direction. Then $$2T = AR + B \tag{1}$$

The resistance AR can be estimated as $$AR = CdA \tfrac{1}{2} \rho VC2,$$

where Cd is the drag coefficient which can have a value of 2 at most, A is the horizontal area of the hovercraft A=6'×

16'=8.71 m2 and ρ is the density of air ρ=1.2 kg/m3. For a vertical velocity VC=1 m/s, AR=10 N and for VC=2 m/s, AR=40 N.

In the case of simple hovering where VC=0 and AR=0, each of the two rotors has to supply a thrust force TH which has to be equal to half the total weight, thus

TH=B/2=890 N.

In this case, conservation of momentum and mass indicate that $T_H=\dot{m}W_H$, where m is the mass flow rate through the rotor and W is the exit velocity. The mass flow rate $\dot{m}$ is given by $\dot{m}=\rho A_D W_H$, where AD is the cross sectional area of the duct, AD=πD2/4=1.13 m2. Under these conditions $W_H=[T_H/\rho A_D]^{1/2}$=25.6 m/s. The power required for this hovering is given by

PH=THWH  (2)

which becomes

PH=ρADWH3=23 KW=30.5 HP

For accelerating vertical flight, the equilibrium of forces in the vertical direction indicates that 2TV−AR−B=(B/g)γ  (3)

where γ is the vertical acceleration of the vehicle and B/g is its mass. If we assume that γ=g i.e. 1 g vertical acceleration then 2TV−AR−B=(B/g)g or 2TV−AR−B=B and TV=B+ AR/2

This suggests that WV=36 m/s and the power required on the shaft of each rotor is

PV=ρADWV3=65 KW=87HP

Figure 22:
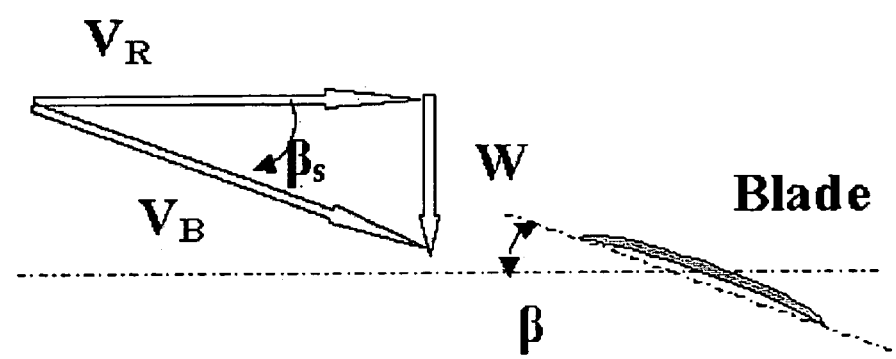
FIG. 22 illustrates the resultant velocity VB of the rotational velocity VR and the axial velocity W for the VTOL aircraft.

For blade lift, each of the blades is expected to produce a lifting force, which can be estimated by the relation Lb=CL AB½ ρVB2  (4)

where CL is the lift coefficient averaged over the blade to be about 0.6, Ab is the area of the blade estimated very conservatively to be about 3" in chord and 20" in length i.e. Ab=0.0762×0.508=0.0387 m2. The velocity VB is the resultant velocity between the rotational velocity VR and the axial velocity W, as shown in FIG. 22. The first one is estimated as the average velocity along the radial extent of the blade to be about 115 m/s at 3600 rpm and W is 36 m/s at maximum during vertical accelerating flight. Thus VB is about 120 m/s. The estimated lift is approximately about Lb=267 N. This is an extremely conservative value. For Nb=6 blades per rotor the lift per rotor will be L=1,600 N which about what is required for 1 g vertical acceleration. This is more than the 890 N required for simple hovering. If a counter-rotating system of two rotors per location is used then the lift generated will be substantially more than is required.

The above calculations suggest that a rotor can be designed to provide the required characteristics. Control of thrust characteristics can be achieved by changing the rpm or the blade pitch angle β. The rotors can be operating in a range of rpm with maximum at 3600 rpm. Small variations in lift requirements can be obtained through changes in the blade pitch angle β. Extremely well designed blades could provide variations of lift to weight ratios from 1:1 to 4:1. For large variations in lift requirements, most probably the blade pitch angle and the rpm have to be changed at the same time.

Figure 23:
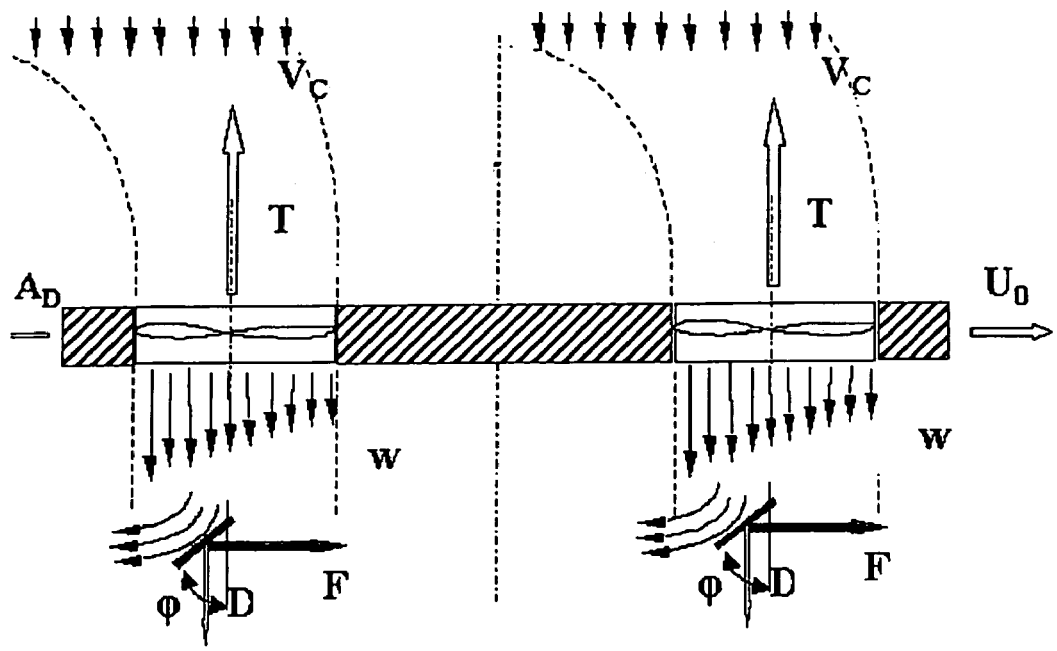
FIG. 23 is a schematic diagram illustrating forward flight with the control vanes extended to generate a propulsive force.

Forward horizontal flight can be achieved by tilting the whole vehicle forward so that part of the vertical thrust can be used for horizontal propulsion or by using the control surfaces of the variable pitch vanes located below the rotor duct. FIG. 23 is a schematic diagram illustrating forward flight with the control vanes extended to generate a propulsive force F. The flow patterns of the flow around the vehicle and the flow coming into and out from the rotor duct will change depending on the value of the forward velocity U0.

Rotation of the vanes will not only create a propulsive force F but will also generate a downwash component due to the local drag D, which is acting in the opposite to the rotor thrust direction. The force F can be approximated through the relation F=CFAC sinφ½ ρW2  (5)

where CF is a force coefficient equivalent to a lift coefficient with a value of about 1.2, AC is the surface of the control surface with dimensions 4'×1/2'=2 ft2=0.18 m2. The sinφ represents the projection of the surface AC into the direction of the local flow direction W. For a typical value of φ=45o sinφ=0.707.

During forward motions a drag force AD develops in the direction opposite to that of the motion, which acts on the whole vehicle. This drag force is related to the velocity U0 through the classical relation

AD=CDA½ρU02  (6)

where CD=1 and A is the cross-sectional area of the hovercraft 5'×6=30 ft2=2.7 m2. In steady state horizontal flight, equilibrium of forces in the horizontal direction requires that

2F=AD  (7)

This leads to a relation between U0 and W:

$$U_0/W = \left[\frac{2C_F\sin\phi}{C_D}\frac{A_C}{A}\right]^{1/2} = \left[\frac{2\times 1.20\times 0.7}{1}\times\frac{0.18}{2.7}\right]^{1/2} = 0.33$$

For W=26 m/s the steady state forward velocity appears to be U0=8.5 m/s. The propulsive force appears to be F=61 N and the total drag of vehicle is AD=120 N. Marginally higher propulsive forces and therefore larger forward velocities U0 can be achieved by increasing the surface of the vanes. This surface can be increased at most up to half the duct area AD/2=0.56 m2. This, however, is not recommended because the flow through the duct will be heavily blocked with a probable adverse upstream effect on the rotor performance.

Figure 24:
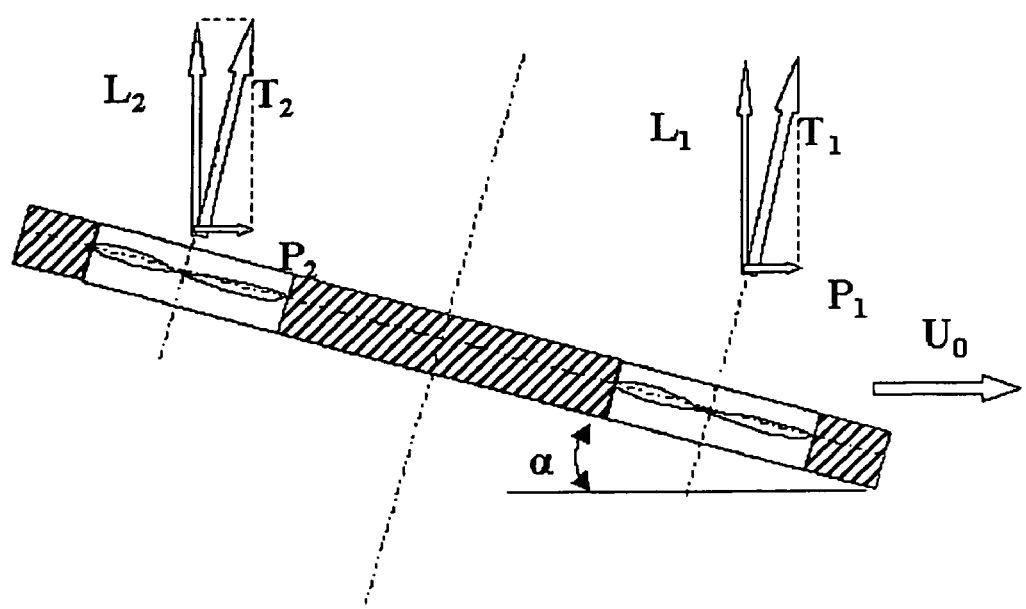
FIG. 24 illustrates tilting of the vehicle by a small angle a for higher velocity or horizontal acceleration.

If higher U0 velocity or horizontal acceleration is required then tilting of the whole vehicle by a small angle α, as shown in FIG. 24 can provide an addition propulsive force P=P1+P2. In this case one of the rotors has to provide higher thrust so that the vehicle is tilted forward.

Then this additional force is

P=T2sinα+T1sinα

For a=5o then P can be about 155 N.

Figure 25:
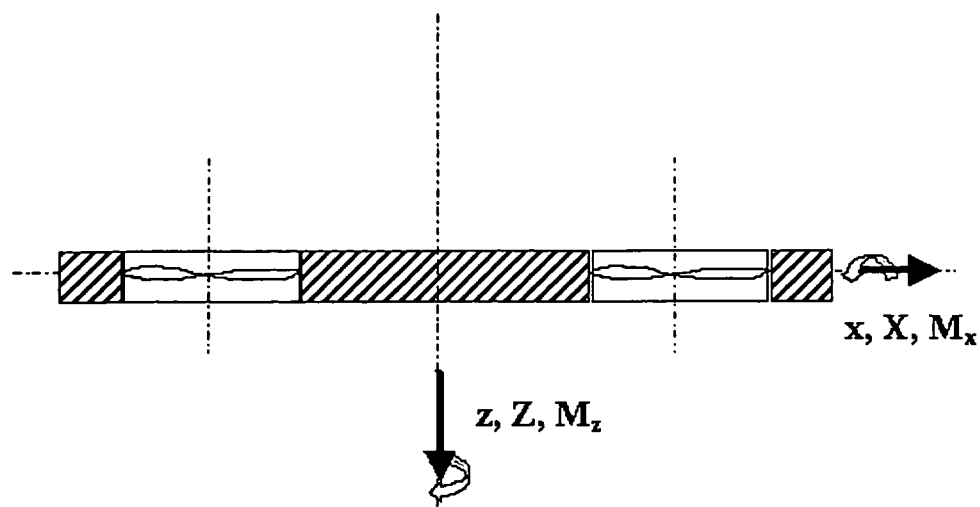
FIG. 25 illustrates a coordinate system fixed to the vehicle as adopted for evaluation of vehicular stability.

For evaluation of vehicular stability, a suitable coordinate system fixed to the vehicle was adopted as shown in FIG. 25. The forces acting on the vehicle are aerodynamic forces, thrust and gravitational forces. In a similar manner, the moments acting on the vehicle can be divided into moments created by the aerodynamic load distribution and the thrust force not acting through the center of gravity. The moments are defined as follows:

Mx, rolling moment
My, pitching moment
Mz, yawing moment.

Figure 26:
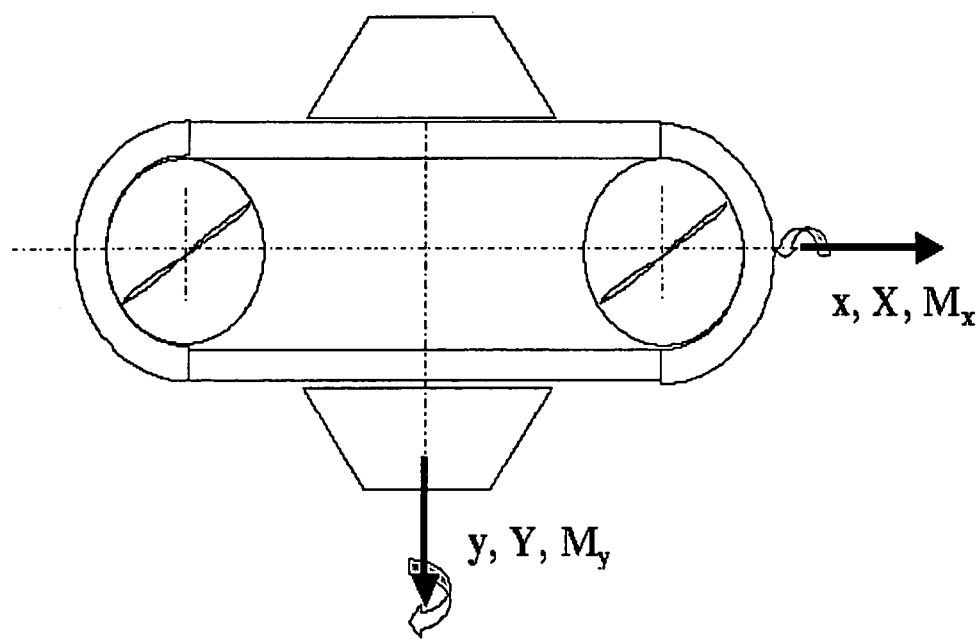
FIG. 26 illustrates the expected forces when the hovercraft flies horizontally and is perturbed by a pitching moment.

Static stability requires equilibrium of forces and moments. Otherwise the vehicle is under linear or angular acceleration. In classical terms, a flying object is considered stable when there is a restoring moment or force counteracting a small perturbation of equilibrium. For instance, if it is assumed that the hovercraft flies horizontally and it is suddenly perturbed by a pitching moment then it can assume a position similar to that shown in FIG. 26. A restoring force and control system are required for stability. Control parameters include the blade pitch angles, rpm of rotors, control surfaces provided by two vanes in each of the two ducts with the rotors and the two rotating wings with the two adjustable flaps.

Control of the linear motion in the longitudinal direction can be provided by the two vanes in the two ducts housing the rotors. Each can provide control forces in the range of −60 N to +60 N. One typical situation is the case of decelerating flight from a constant speed of 9 m/s to zero longitudinal velocity. Forward rotation of the two vanes will provide a decelerating force of $$2F+AD=-\gamma(B/g) \quad (8)$$

For the values of F and AD obtained in the sections above, the deceleration γ appears to be γ=0.13 g=1.27 m/s2. This suggests that the time to stop is U0/γ=7 s and the distance ½γt2=31.5 m. Shorter breaking distances can be achieved by tilting the vehicle around the y-axis at angles opposite to those shown in FIG. 26.

Control of the rolling motion (moment) can be provided by the two flaps of the external wings and the two split vanes in the y-direction. The force provided by the two external flaps is quite small because the velocity in the longitudinal direction is low. However, the control rolling moment is high because the flaps are located far away from the longitudinal axis, as opposed to the two split vanes which can generate larger forces, but their proximity to the x-axis prohibits them for providing effective rolling control. The contribution of the external wings to the total lift is very small, of the order of 30 N each, despite their large size because the velocity U0 is small. However, they can provide rolling stability in the classical sense which can be stable if the dihedral angle formed by the two wings is positive.

Figure 27:
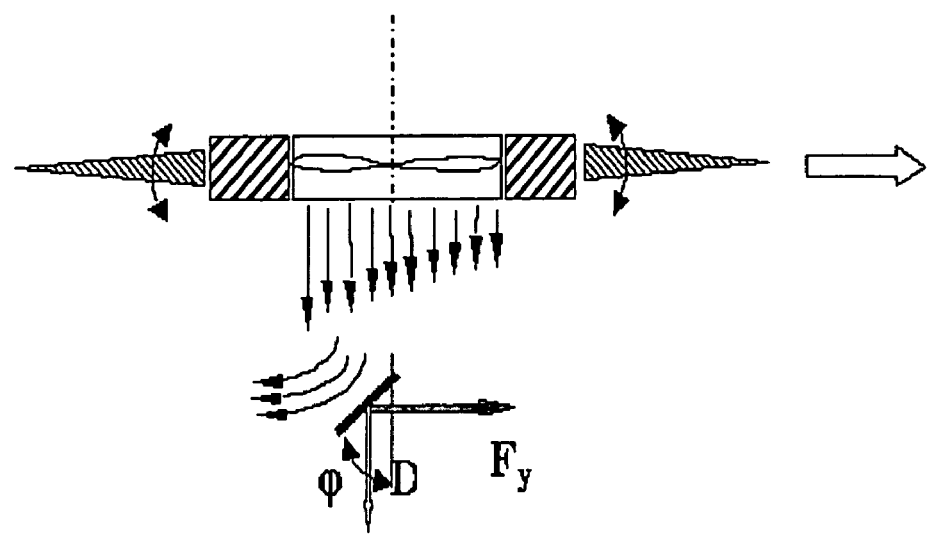
FIG. 27 illustrates the use of the air vane assembly to control lateral linear motion of the vehicle.

Lateral linear motion can be provided by the split vanes when they are all rotated in the opposite direction. This type of motion may be required as part of the vehicle's maneuverability. The two large external wings can provide the required stability, as illustrated in FIG. 27. Control of the lateral moment My can be provided by changing the blade pitch angle, which is probably the most effective way but probably slow in frequency response and/or the two split vanes. Both control mechanisms can generate a stabilizing lateral moment needed to counteract a destabilizing lateral rotational motion.

For vertical stability requirements, control of the vertical linear motion of the vehicle is provided by the thrust generated by the two rotors. This motion can be controlled by the blade pitch angle or the rpm of the rotors. Each rotor, due to the rotating blade drag force, generates a vertical torque which needs to be balanced. Counter-rotation of the second rotor changes the direction of the vertical torque and overall balance of the moments can be achieved. In the case of two single rotors placed at two different positions on the vehicle, it is possible to balance the two torques generated by the two rotors through counter-rotation. However, due to misalignments of various parts, it is never perfect and therefore the vehicle will develop a small yawing position in forward flight. Some additional counter action can be provided by the split vanes. Since it is always better to balance this torque by counter rotation at the same place, the use of the dual counter-rotating rotor assemblies are preferred. Control of yawing motion due to vertical moments can be provided by the split vanes arrangement below the rotors. It is estimated that these split vanes can generate a torque up to 20 Nm.

An integrated control system for the several control mechanisms can provide, in principle, the required stability and control of the hovercraft. A more quantitative analysis is needed before performance data on maneuverability can be predicted. An integrated control system with specific control strategies and objectives can be devised to address successfully all the control needs of this vehicle.

Based on the findings in the above sections, the minimum electrical power to operate the hover aircraft of the assumed parameters is 130 KW or 174 HP, providing the actuators give 100% efficiency. A hydrogen fuel cell or battery that supplies this electrical power must be light weight so the total weight of the aircraft does not exceed the estimated 400 lbs. Existing fuel cells do provide the required power but improvements must be made in order to reduce the overall weight. Hydrogen fuel packaged in a lightweight ballast tanks is not recommended, as a safety issue would arise. The alternative options discussed below should reduce the power requirement and subsequently the overall weight of the energy source.

The maglev arrangement for the rotor uses low friction magnetic bearings to improve system energy efficiency. Additionally, improvement in the use of lightweight components and design of mass distribution of the rotor is a plus to the overall aircraft design. Examples of desirable parameters for the maglev rotors in the assumed size of two-engine vehicle are as follows:

Rotor ID: 48 in.
Stator OD: 50.63 in.
Stator Height: 1.75 in.
Rotor weight 14.5 lb.
Stator weight 49.8 lb.
Suspension Power at 200 lb. lift, spin axis vertical: 82 W
Suspension Power at 400 lb. lift, spin axis vertical: 118 W
Suspension Peak Power at start up: 750 Wze
Motoring efficiency for hover (42 HP) 94% Motor, 95% Electronics
Motoring efficiency for hover (87 HP) 90% Motor, 92% Electronics With the above parameters, the total weight for the two actuators is about 130 lbs. However, this analysis indicates that smaller impellerdisks would provide enough power to drive the hover aircraft and, therefore, smaller and lighter maglev rotor assemblies can be used, and the electrical power requirement can be reduced. The evenly distributed mass of the maglev rotor makes it a good fit for use in the hover aircraft and simplifies aircraft structure design.

Figure 28:
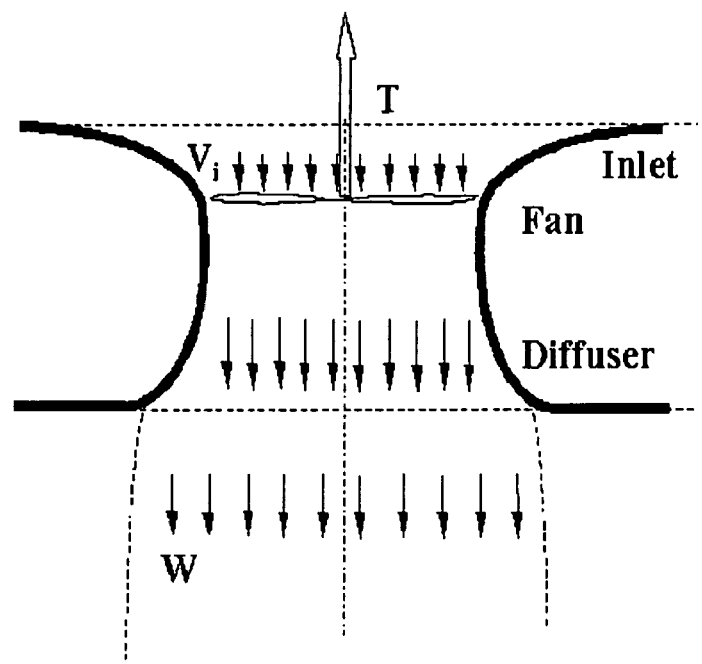
FIG. 28 illustrates the use of a diffuser at the duct of the rotor to achieve a substantial reduction in power required.

Other alternatives and recommendations include the following. Substantial reduction in power can be achieved by having a diffuser at the duct of the rotor as shown in FIG. 28.

The introduction of a diffuser and the streamlining of the inlet in the rotor duct may reduce the required power by 10 to 15 percent.

Because of the drag force on the rotor blades, a torque is experienced by the aircraft in the opposite direction of the rotor. This torque needs to be counteracted or balanced. To avoid misalignment of rotating parts, it is best to have dual counter-rotating rotors at the same place. A double rotor impeller system not only balances this torque, but also increases airflow through the system and therefore a high thrust force can be obtained. If the overall system weight stays the same, a double rotor impellerdisk system can be made smaller. A smaller rotor can also rotate at higher speed and still operate in the subsonic range. With smaller rotors and a reduced cross section of duct, the overall electrical power requirement can be reduced. Additionally, a smaller maglev engine will lower overall system weight.

In the two-engine design having two impellerdisks installed along the centerline in the front and the back of the cockpit, the aircraft can counteract any disturbing pitching (My) and yawing moments (Mz), as the two impellerdisks can provide a reaction force. However, if the intended application may involve a large disturbing rolling moment, Mx, about the axis along the centerline, the three-engine with overhead wing design is recommended as the lift forces on the wings will help to prevent rolling, and the triangular configuration will make the aircraft stable in all directions. Since smaller double-impellerdisks can be used to provide sufficient thrust force, three smaller dual-rotor impellerdisks can be installed in a vehicle with the same or smaller footprint. The cockpit can remain in the center of the aircraft with an impellerdisk in the front and two more on each side of the aircraft behind the cockpit. Using the three-engine triangular configuration mentioned above, the air vane assembly can be modified by eliminating the vane along the centerline. This vane originally was designed to generate a lateral force for aircraft maneuver. However, in the triangular configuration, operating the split vane on one side that is normal to the direction of the travel would generate the required lateral force in a more efficient manner. Tilting the split-vane on the left side more than the one on the right side would make the aircraft turn right. This would simplify the vane system design as well as the control system.

For liftoff, the impellerdisk is ramped up to speed with the blades in a neutral or zero thrust position until it reaches the necessary rpms to produce lift. Vertical thrust is then developed by changing the pitch of the rotor blades using the blade pitch change mechanisms. An integrated flight control system can be developed which uses controls for changing the rotor speed and blade pitch in an optimum combination together and/or to conserve on power usage if necessary or desired. Load forces on the impellerdisk during thrust loading are countered by the permanent magnet bearings. Since the bearing magnetic force is inversely proportion to the square root of the gap size, the smaller the gap becomes, the higher the magnetic force. When the gap is very small, the force becomes extremely high and is equally distributed along the circumference of the rotor, thereby countering the tendency of loading forces to displace the rotor. Load forces are also countered by the gyroscopic inertia due to the perimeter-weighted disk configuration of the rotor, and are transferred through the support shroud and absorbed in the composite frame/body.

For normal take off and landing (1–2 g), the change in blade pitch would be good enough to generate the required thrust. Extremely well-designed blades could provide higher variations of lift to weight ratios from 1:1 to 4:1. The optimum blade number, chord, angle of attack of the blades, and the tolerance between the blade tip and the shroud can be determined through CAD testing. The speed of the impellerdisk/rotor does not need to be widely varied during flight, since it is easier to vary the thrust through changing the pitch of the rotor blades than to change the speed of the rotor. An integrated flight control system can employ a CPU to make automatic micro adjustments to rotor blade pitch to compensate for load changes during flight.

The impellerdisk configuration employing a circumferential outer ring driven by magnetic induction elements has the advantage of distributing the heat generated over a large surface area and at the position where the surface is moving at highest speed, in contrast to a normal shaft driven electric motor. To further eliminate any heat problems, a series of air intake valves can be provided below the linear induction magnetic bearing to suck cool air in, and another series of heat exhaust valves can be provided above the linear induction magnetic bearing to push hot air out.

The shroud mounting of the magnetic induction drive elements has the additional advantage of isolating the rotor for safety purposes, and also deflecting and/or absorbing air thrust noise. An optimized design of the shroud (including the possible use of an exit diffuser) can result in deflection of most noise in an upward direction or its absorption, thereby improving the quiet operation of the vehicle relative to persons on the ground.

The high mechanical efficiency of the maglev bearing and magnetic induction drive for the air thrust rotor(s) ensures that sufficient lift and translation thrust can be generated for the hover aircraft with relatively low power requirements. The use of lightweight component parts and optimized mass distribution for the rotor assemblies can increase drive efficiency and reduce power requirements further. Continued improvements in battery technology to increase electric storage densities and reduce component weight, and in fuel cell technology in terms of more tractable fuel storage, catalyst improvements, and component weight reduction, can be applied to improve impellerdisk efficiency, engine performance, power-to-weight ratios, power supply efficiency, and flight duration in hover aircraft of the present invention. Similarly, improvements in shroud design can be expected to provide improvements in noise abatement and component weight reduction.

It is understood that many other modifications, variations, and improvements may be devised given the above description of the principles of the invention. It is intended that all such modifications and variations be considered as within the spirit and scope of this invention, as defined in the following claims.

The invention claimed is:

1. A vertical take-off and landing aircraft, comprising:
   (a) a main body adapted for flight while oriented substantially in a horizontal plane;
   (b) at least one air impeller engine mounted in said main body oriented substantially along a vertical axis normal to the horizontal plane having an impeller rotor mounted within an air channel duct or shroud formed in said main body of said aircraft, said impeller rotor being formed with impeller blades with inner ends fixed to a central hub and outer ends fixed to an annular impeller disk rotatable about a rotational axis aligned with the vertical axis to propel a downward flow of air to provide vertical lift to the aircraft and a magnetic bearing system for suspending the impeller rotor substantially friction-free within the air channel duct or shroud;

(c) a magnetic induction drive formed by one array of magnetic induction elements arranged circumferentially on the annular impeller disk of said impeller rotor and another array of magnetic induction elements arranged on a wall of said air channel duct or shroud facing opposite the array on the annular impeller disk across a small air gap therebetween for driving the impeller disk in rotation by magnetic induction; and (d) an air directing assembly for directing at least a part of the thrust flow of air from the air impeller engine in a desired angular direction with respect to the horizontal plane to generate a horizontal thrust component for maneuvering or translation movement of the aircraft, wherein said air directing assembly is an air vane assembly mounted below said air impeller engine having one or more rotatable vanes in a parallel array mounted to a rotatable support ring, a first actuator means for rotating the vanes at a selected deflection angle on an axis in the horizontal plane, and a second actuator means for rotating the support ring on the vertical axis, for directing the thrust flow of air in a desired angular direction.

2. A vertical take-off and landing aircraft comprising:

(a) a main body adapted for flight while oriented substantially in a horizontal plane;

(b) at least one air impeller engine mounted in said main body oriented substantially along a vertical axis normal to the horizontal plane having an impeller rotor mounted within an air channel duct or shroud formed in said main body of said aircraft, said impeller rotor being formed with impeller blades with inner ends fixed to a central hub and outer ends fixed to an annular impeller disk rotatable about a rotational axis aligned with the vertical axis to propel a downward flow of air to provide vertical lift to the aircraft, and a magnetic bearing system for suspending the impeller rotor substantially friction-free within the air channel duct or shroud;

(c) a magnetic induction drive formed by one array of magnetic induction elements arranged circumferentially on the annular impeller disk of said impeller rotor and another array of magnetic induction elements arranged on a wall of said air channel duct or shroud facing opposite the array on the annular impeller disk across a small air gap therebetween for driving the impeller disk in rotation by magnetic induction; and (d) an air directing assembly for directing at least a part of the thrust flow of air from the air impeller engine in a desired angular direction with respect to the horizontal plane to generate a horizontal thrust component for maneuvering or translation movement of the aircraft, wherein said annular impeller disk is formed as a hollow annular channel containing pitch change mounting means therein coupled to the outer ends of the rotor blades for varying the pitch of the rotor blades.

3. A vertical take-off and landing aircraft according to claim 2, wherein said hollow annular channel of said annular impeller disk contains for each blade a stepper motor drive for rotating the end of the blade, control means for receiving a blade pitch control signal and providing it to the stepper motor drive, and a power source for supplying power to the stepper motor drive for rotating the end of the blade, said components being distributed circumferentially around the hollow annular channel at respective positions of the blade ends for a even distribution of mass.

4. A vertical take-off and landing aircraft according to claim 2, wherein said air impeller engine is provided with dual coaxial, contra-rotating rotors arranged one on top of the other for gyroscopic stability.

5. A vertical take-off and landing aircraft according to claim 4, having a single air impeller engine arranged on a central vertical axis of the vehicle.

6. A vertical take-off and landing aircraft according to claim 4, having two air impeller engines arranged at opposite ends of the main body formed with a longitudinal fuselage chassis and balanced about its center of gravity.

7. A vertical take-off and landing aircraft according to claim 4, having three engines positioned in a triangular arrangement on the main body balanced about its center of gravity.

8. A vertical take-off and landing aircraft according to claim 7, wherein one engine is positioned at a forward apex of the triangle oriented in a forward flight direction and the other two engines are spaced apart and carried on an overhead wing mounted on the main body.

9. A vertical take-off and landing aircraft according to claim 4, having multiple engines positioned in a symmetrical arrangement on the main body and balanced about its center of gravity.

10. A vertical take-off and landing aircraft according to claim 4, wherein said main body is formed with a longitudinal fuselage chassis oriented in a forward flight direction and a pair of winglets arranged on respective sides of the longitudinal fuselage chassis for controlling flight stability.

11. A vertical take-off and landing aircraft according to claim 2, having air rudders or flaps provided on said main body for controlling flight stability.

12. A vertical take-off and landing aircraft according to claim 2, wherein said main body is formed with a longitudinal fuselage chassis oriented in a forward flight direction and an overhead wing mounted on said main body for providing lift and controlling flight stability.

13. A vertical take-off and landing aircraft according to claim 2, wherein said magnetic induction drive is powered by electric power provided by lightweight batteries carried on said main body.

14. A vertical take-off and landing aircraft according to claim 2, wherein said magnetic induction drive is powered by electric power provided by lightweight fuel cells carried on said main body.

* * * * *